United States Patent
Van Mooy et al.

(10) Patent No.: US 10,486,991 B2
(45) Date of Patent: Nov. 26, 2019

(54) SYSTEMS AND METHODS FOR CONTINUOUS MEASUREMENT OF AN ANALYTE

(71) Applicant: WOODS HOLE OCEANOGRAPHIC INSTITUTION, Woods Hole, MA (US)

(72) Inventors: Benjamin Van Mooy, Famouth, MA (US); Paul D. Fucile, Waquoit, MA (US); Glenn E. McDonald, Marston Mills, MA (US)

(73) Assignee: Woods Hole Oceanographic Institution, Woods Hole, MA (US)

( * ) Notice: Subject to any disclaimer, the term of this patent is extended or adjusted under 35 U.S.C. 154(b) by 182 days.

(21) Appl. No.: 15/827,681

(22) Filed: Nov. 30, 2017

(65) Prior Publication Data
US 2018/0148360 A1 May 31, 2018

Related U.S. Application Data

(60) Provisional application No. 62/428,204, filed on Nov. 30, 2016.

(51) Int. Cl.
*C02F 3/00* (2006.01)
*B01L 3/00* (2006.01)
*C02F 3/12* (2006.01)

(52) U.S. Cl.
CPC .......... *C02F 3/006* (2013.01); *C02F 3/12* (2013.01); *B01L 3/5027* (2013.01);
(Continued)

(58) Field of Classification Search
CPC .......... C02F 2209/001; C02F 2209/003; C02F 2209/006; C02F 2209/02; C02F 2209/08;
(Continued)

(56) References Cited

U.S. PATENT DOCUMENTS

| 5,922,158 A | 7/1999 | Culp et al. |
| 2002/0037588 A1* | 3/2002 | Neeper ............... B01J 19/0046 436/45 |

(Continued)

OTHER PUBLICATIONS

Yang S et al (Sep. 6, 2017) Polymeric Optical Sensors for Selective and Sensitive Nitrite Detection Using Cobalt(III) Corrole and Rh(III) Porphyrin as Ionophores. Analytica Chimica Acta. vol. 843:89-96.

(Continued)

*Primary Examiner* — Jennifer Wecker
(74) *Attorney, Agent, or Firm* — Richard L. Vail; Robert Devin Ricci; Kean Miller LLP

(57) ABSTRACT

Described herein is a system to provide continuously measurements of an analyte present in a fluid sample, particularly dissolved oxygen in wastewater. The system comprises a sample chamber absent of ambient light to contain the sample and in many embodiments employs a non-invasive method of measuring the analyte and determining the change over time in the concentration of the analyte. It is also an aspect of the invention to deliver analyte measurements in real-time and provides the operator with feedback in substantially less time after sample collection than previously accomplished in the field. It is another aspect of the invention to simultaneously or at least in a substantially short period of time thereafter measure temperature to remove initial error encountered at the start of analyte measurement at least until the sample chamber reaches thermal equilibrium.

21 Claims, 9 Drawing Sheets

(52) U.S. Cl.
CPC ..... *B01L 2200/10* (2013.01); *C02F 2209/001* (2013.01); *C02F 2209/003* (2013.01); *C02F 2209/006* (2013.01); *C02F 2209/02* (2013.01); *C02F 2209/08* (2013.01); *C02F 2209/22* (2013.01); *C02F 2209/24* (2013.01); *Y02W 10/15* (2015.05); *Y02W 10/37* (2015.05)

(58) Field of Classification Search
CPC .. C02F 2209/22; C02F 2209/24; C02F 3/006; C02F 3/12; Y02W 10/15; Y02W 10/37; B01L 3/5027; B01L 2200/10
See application file for complete search history.

(56) References Cited

U.S. PATENT DOCUMENTS

2003/0032191 A1* 2/2003 Hilson ............. G01N 35/00029
436/47
2017/0332612 A1 11/2017 Partan et al.

OTHER PUBLICATIONS

Kim et al. (Nov. 15, 1998) Microtiter Plate-Format Optode. Analytical Chemistry vol. 70 No. 22, 4860-4863.
Billingsley (May 1, 2010) Fluorescent Nano-Optodes for Glucose Detection. Analytical Chemistry vol. 82, No. 9, 3707-3713.
Standard Methods 5210 B; 5-day BOD Test (Nov. 16, 1999).

* cited by examiner

SYSTEMS AND METHODS FOR CONTINUOUS MEASUREMENT OF AN ANALYTE

CROSS REFERENCE TO RELATED APPLICATIONS AND PUBLICATIONS

This application claims priority to U.S. Provisional Application No. 62/428,204 filed on 30 Nov. 2016. The entire contents of the above-mentioned application are incorporated herein by reference. All references mentioned in this application are herein incorporated by reference without disclaimer.

FIELD OF THE INVENTION

The invention pertains to systems and methods of detecting, measuring, monitoring, and controlling the concentration of an analyte in a sample. More particularly, the invention pertains to the measurement of a gas analyte including oxygen and/or carbon dioxide with the goal of calculating biological oxygen demand of a wastewater sample.

BACKGROUND OF THE INVENTION

Oxygen demand is the rate of dissolved oxygen consumed in a fluid sample 12 over a given time at a given temperature. Biological oxygen demand (BOD) is the rate of the oxygen consumption specifically by aerobic organisms. Aerobic organisms in aquatic ecosystems or drinking water require dissolved oxygen to break apart organic materials. BOD is therefore a predictive value for readily decomposable organic molecules, or organic pollution, in a fluid (e.g. a wastewater effluent). BOD depends and varies based on temperature, nutrient concentrations, enzymes and microorganisms present in the sample. BOD is a calculated value and is not measured directly. Photosynthesis and respiration are arguably the defining parameters of carbon cycling in aquatic ecosystems (freshwater and saltwater). Respiration is also primary components of oxygen demand measurements (BOD) in the water quality community.

The Clean Water Act section 304(a)(4) designated BOD as a "conventional" pollutant. The Code of Federal Regulations Title 40, Chapter 1, Subchapter D, Part 136.3 (40 CFR Ch. I(d) § 136.3) establishes the guidelines and lists the approved test procedures for measuring substances, including BOD. The approved test is Standard Methods 5210 B; 5-day BOD Test (also referred to as $BOD_5$), available at www.EPA.gov, and incorporated herein.

Alternative tests, that are much easier to perform, such as total organic carbon (TOC) and chemical oxygen demand (COD) are available but are less favored by regulators as BOD directly measures the bioavailability of the waste in the discharge. However the BOD test has limitations including the length of time required to run, results are imprecise and unpredictable, and the method requires skill and control of test conditions. In addition to the uncertainty factor, five days is problematic as it will be at least five days until the operator knows that a test was invalid and the opportunity to retest likely would have passed. Temperature control is a critical factor and would be more susceptible to swings over a longer period.

BOD tests provide an empirically calculated measure of the remaining oxygen demand in untreated wastewater or a treatment plant effluent. Whereas effluent limits are typically met during apparent normal operations of a biological treatment system, such is not assured and operators must wait five days for confirmation. Given the uncertainty created by the five day wait, facility operators may operate in a conservative mode and over-aerate the biological reactors. A need exists to obtain quicker BOD results to facilitate sufficient and efficient treatment.

Wastewater facilities generally practice aeration with set dissolved oxygen (DO) targets and control these levels without consideration of the actual moment-to-moment oxygen load requirement present in a tank. The over-aeration is typically an additional 20% to 40% more oxygen than actually needed for efficient processing. As a result, sludge aeration energy costs account for between 50% and 70% of facility operation costs. Measuring BOD at intervals significantly less than 5 days could facilitate vastly faster feedback control time of aeration levels based on BOD and could lead to at least a 3% to 6% reduction in overall plant costs.

The standard procedure for performing the 5-day test is detailed in the Standard Methods for Examination of Water and Wastewater (5210 Biochemical Oxygen Demand provided by the EPA). Ideally, samples should be processed within 2 hours of sample collection or should be otherwise stored at or below 4° C.±2° C. up to 24 hours post-collection but preferably less than 6 hours post-collection. The overall method consists of overfilling an airtight bottle with the fluid sample, diluting the sample, adding the chemical reagents, bringing dilution water temperature to 20±3° C., measuring the initial dissolved oxygen level, incubating the sample at 20±1° C. and measuring the final dissolved oxygen level 5 days post-collection. Significant opportunity exists to obtain invalid results and given the 5 day test period, no information, useful or not, is generated until the fifth day.

TABLE 1

Summary of BOD quality control procedures.

| Quality Control Element | Frequency | Acceptance Criteria |
| --- | --- | --- |
| Unseeded dilution water | One per batch or sample group (1 per 20 samples minimum) | DO uptake <0.2 mg/L (preferably <0.1 mg/L) |
| Standard check solution | One per batch or sample group (1 per 20 samples minimum) | Laboratory control limits |
| Seed control standard | One per batch or sample group (1 per 20 sample minimum) | DO uptake between 0.6 and 1.0 mg/L |
| Duplicate sample | One per batch or sample group (1 per 20 samples minimum) | RPD 5X CRDL; ±CRDL for samples |

Source: Biochemical Oxygen Demand (BOD) Standard Method 5210 B (5-day BOD Test); www.EPA.gov While the $BOD_5$ Standard Method meets the water quality testing requirements, the lag between sampling and data acquisition prevents effective use of the information for the benefit of improved operational efficiency. A five day compliance sample cannot provide timely data as it would be necessary to break the seal in advance of the 5 day wait period, invalidating the result. Sequential shortened-time results could be obtained by pulling multiple samples and testing at varying intervals. Unfortunately this would require many samples, further complicating maintenance of control of critical Standard Method parameters such as temperature and light. Thus, there is an unmet need for a continuous measurement of BOD with the ability for results reflecting the current state of the wastewater treatment process.

SUMMARY OF THE INVENTION

Currently used in the wastewater treatment field, BOD measurements are the result of a time-consuming process mandated by the EPA which reflects facility operational efficiency. While the 5-day BOD test is the current standard in the field, the test has inherent limitations. For example, in order to obtain a reliable BOD calculation (slope of oxygen consumption), DO concentrations are measured before and after the 5 day period. However, BOD values are only acceptable if they fall in a narrow range of at least 1 mg/L and at least 2 mg/L lower in concentration than the initial DO measurement (American Public Health Association). Unfortunately, it is only made apparent by the final DO measurement if error is present or the results do not meet this necessary criteria. In addition to operator error, certain constituents in the fluid sample 12 can inhibit the biological reactions such as caustic pH levels, toxins, heavy metals, and other pollutants. Also, if adequate nutrients are not available for the microorganisms to perform the oxidation, BOD values will be unreliable.

The present invention is directed to novel systems and methods for detecting, measuring, analyzing, and monitoring the concentration of an analyte continuously in real time. This invention is particularly suited for measure the concentration of an analyte that changes over time. For example, sequential analysis of oxygen at known intervals or increased concentrations of carbon dioxide overtime can be used to calculate BOD. Such measurements are important for process control capabilities in the wastewater treatment arena as these measurements are used to tailor adjustments to the facility's waste management operations. With accurate, fast BOD measurements, facility operators can control aeration levels for optimal waste digestion by matching the aeration levels to the oxygen consumption levels which reduces facility operating costs.

In other embodiments, the invention provides reagent-free, continuously updating analyte measurements of other analytes. The invention is particularly valuable where concentration varies over time. As such, the invention could be used to determine reaction rates associated with the appearance or disappearance of any measurable analyte.

According to one embodiment, the system is a bench top device designed to replace the current EPA-mandated 5-day BOD test. This system employs a conveyer with one or more sample chambers 14 which rotates during operation to measure the concentration of the analyte in each sample chamber 14 which facilitates the continuous analyte measurements. According to another embodiment, the system is a solid state bench top device which does not require a conveyer to perform measurements. The sample chambers 14 remain substantially stationary during operation. According to another embodiment, the system is a device integrated in-line with the facility plumbing to perform measurements.

Included herein are a series of system claims and a series of method claims. Systems claims describe a system that allows multiple analysis of a sample over a period of time on the exact same sample. This feature is especially useful where the concentration changes with time. One example is the concentration of oxygen in a wastewater sample analyzed for biological oxygen demand. In the case of biological oxygen demand, the system and companion method allows for an early calculation of the expected value while allowing the sample to incubate for the full five days required by the standard method (as required to demonstrate compliance with effluent limitations).

BRIEF DESCRIPTION OF THE DRAWINGS

The drawings described herein constitute part of this specification and includes exemplary embodiments of the present invention which may be embodied in various forms. It is to be understood that in some instances, various aspects of the invention may be shown exaggerated or enlarged to facilitate an understanding of the invention. Therefore, drawings may not be to scale.

DEFINITIONS

Figure 1:
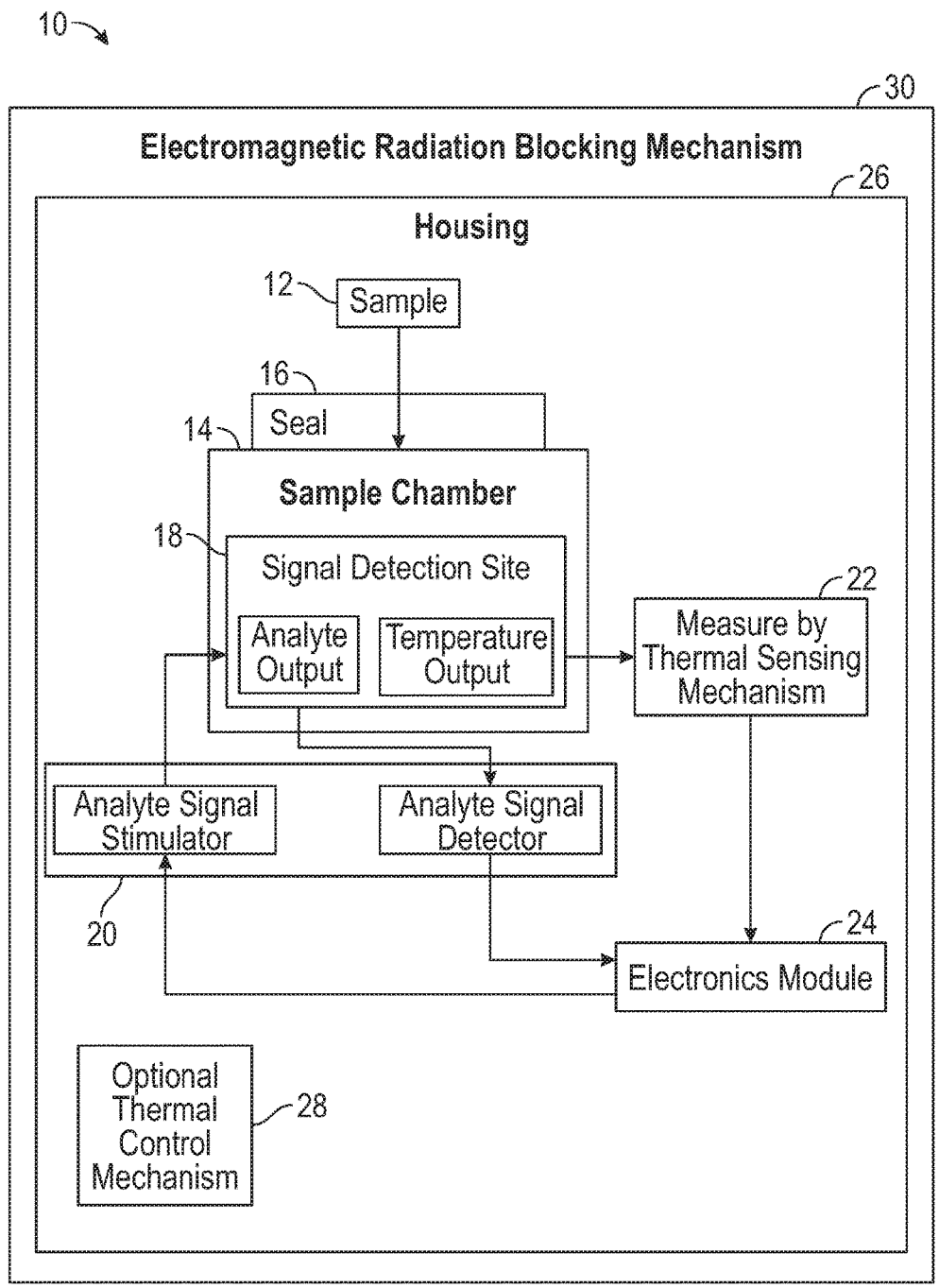
FIG. 1 depicts a conceptual drawing of the various components and their relationship to each other.

Unless otherwise defined herein, scientific and technical terms used in this application shall have the meanings that are commonly understood by those of ordinary skill in the art. Generally, the nomenclature and terminology used in connection with, and techniques of, engineering, biology, environmental monitoring, hydrology, water science and management, and other related fields, described herein are those well-known and commonly used in the art.

The term "air tight" or "airtight" refers to a sample chamber 14 or any suitable container that is impermeable to air or other gas or nearly so. Airtight containers do not allow the entrance or escape of air or gas. For the purpose of this disclosure, airtight specifically refers to the time of measurement and may be considered airtight despite very small amounts of air or analyte diffusing through the sample chamber 14, as explained by Fick's Law of diffusion.

The term "sealed sample" or "airtight sample" refers to a sample chamber 14 containing a sample that has been made airtight such that no measurable amount of air or analyte escapes the sample chamber 14. Sealed samples are most often sealed by the sealing mechanism 16.

The term "biological oxygen demand" or "biochemical oxygen demand" (and abbreviated as BOD) refers to a parameter that is representative of the consumption rate or amount of dissolved oxygen required to sustain living microorganisms (e.g., to decompose organic and/or inorganic compounds). BOD is most often measured in the dark, but in some cases may be measured in the presence of light (e.g., partially or fully transparent chamber, open container, etc.). Whereas the standard method is run over 5 days and is referred to as $BOD_5$, BOD can be determined over different time intervals.

The term "sample" refers to any fluid, or partially fluid substance containing an analyte to be measured. The term may further refer to a standard sample, or standardized samples with at least one known parameter, sample concentration, sample consumption rate, or amount of microorganisms.

The term "fluid sample" or "gelatinous sample" is any substance that is fluid, partially fluid, fluid mixture (e.g. a solution) or gelatinous substance that comprises an analyte to be measured. The terms refer to samples that are at least 10%, 20%, 30%, 40%, 50%, 60%, 70%, 80%, 90%, 95%, and up to 100% fluid. Particulates, suspended matter, or sediment may also be present in a fluid or gelatinous sample.

The term "dissolved oxygen" refers to a measure of the amount of oxygen dissolved in a fluid sample 12.

The term "analyte" as described herein is or has a chemical, biological, or physical property which can detected as a signal and may be atoms, molecules, particulates, a microorganism (unicellular and multicellular), or a product of a microorganism.

The terms "micro-titer plate," "microtiter plate," "microwell plate," or "multi-well plate" all refer to a flat plate with multiple wells commonly used in research and pharmaceutical settings, and commonly known in the art. An example is presented in FIG. 6B. Microtiter plates are a standard analytical tool in many testing laboratories, are commercially available from many sources and have generally accepted standard sizes, including plate height, width, and length, as well as well arrangements, sizes and number. Microtiter plates with different number of wells are available in 6, 12, 24, 48, 96, 384 or 1536 sample wells arranged in a 2:3 rectangular matrix. The term, as used herein also refers to "deep-well" versions of microtiter plates that have larger plate and well heights, giving a similarly numbered well plate a larger volume per sample well. Most often, deep-well microtiter plates (also referred herein as "deep-well plates") comprise a 96-well plate with each well holding a maximum of 1 milliliter volume.

The term "sample source" 44 refers to the origin of the sample measured by the present invention. The source may be the original sources, for example wastewater, or the last place a portion of fluid is located before being loaded into the system.

The terms "optode" or "optrode" refers to an optical sensor device that measures a specific substance or analyte. Most optodes are facilitated by a chemical transducer, which is a chemical, chemicals or other molecules that respond to the analyte to be measured. Optodes generally comprise of two components, the chemical transducer, and a polymer or other physical substrate to immobilize the chemical transducer. Optodes then require an external signal detector 20, for example an optical fiber or light source, to measure the chemical reaction occurring at the optode surface. Optodes can be applied to any suitable optical measurement, as commonly known in the art, including luminescence (fluorescence, phosphorescence, bioluminescence, chemiluminescence), and surface plasmon resonance.

The term "ambient light" refers to any light present in the external environment around the present invention. Most often, the ambient light refers to sunlight, or visible light produced by standard room lightening, or other man-made light sources. In some cases, the term ambient light includes near visible light, including infrared and ultra-violet.

The term "signal detector" 20 refers to the portion of the system that emits and collects a signal to and from the analyte detection site 18. In the preferred embodiment, the signal detector 20 has the ability to both stimulate the analyte detection site, and detect the resultant analyte output signal. The signal detector 20 is connected to the electronics module 24, which controls the frequency of signals sent to the analyte detection site 18 and the corresponding frequency of received analyte output signals. The signal detector 20 emits at least a first wavelength of light directed at the analyte detection site 18, and measures the resultant analyte output that returns from the analyte detection site 18 in at least a second wavelength. In the currently preferred embodiment, when the analyte to be measured is dissolved oxygen, the signal detector 20 sends out a blue light wavelengths, and measures red light wavelengths returning from the analyte detection site 18.

The term "near continuous" refers to the rate that the system measures the analyte output signal. The near continuous rate will differ for some embodiments, but in general is expected to be at least every 3 seconds, ever 2 seconds or every 1 second or less than one second. The rate may also be expressed in terms of frequency, for example the preferred rate of 1 Hertz (Hz), or one reading a second.

The term "parameter" refers to the value of a physical, chemical, or biological property of a measured or about to be measured system.

The term "wastewater" or "waste water" refers to any fluid, or partially fluid substance that is a product, by-product or waste product of a human activity, including domestic, industrial, commercial or agricultural activities. Examples include, but are not limited to sewage, urban runoff, organic industrial waste, agricultural runoff, and agricultural pollution. Wastewater from organic industrial waste further includes beverage, pharmaceutical, pesticide, ice cream, and foodstuff manufacturing. Wastewater further includes both treated (wastewater facility effluent) and unprocessed ("raw") fluids.

DETAILED DESCRIPTION OF THE PREFERRED EMBODIMENTS

Overview

The present invention described herein facilitates the qualitative and quantitative monitoring of an analyte in a fluid sample 12, particularly an analyte associated with investigating water quality of the fluid sample 12. In many embodiments, the system measures an analyte relating to biological oxygen demand (BOD) of or within the sample. It is an object of the present invention to provide a system capable of measuring DO concentrations continuously throughout the incubation period and providing the results significantly faster than the current method in use which leads to earlier notification of potential issues relating to a specific sample, or the facility operation from which the sample originated.

FIG. 1 presents a conceptual drawing of one embodiment. A fluid sample 12, held in an air-tight sample chamber 14, is exposed to an analyte signal stimulator (source of specific wavelength of light) causing a signal detection site 18 (i.e., optode) to emit a different wavelength of light that is received by the analyte signal detector 20. This equipment is located in a housing 26 that is surrounded by an electromagnetic radiation blocking mechanism 30.

Figure 2:
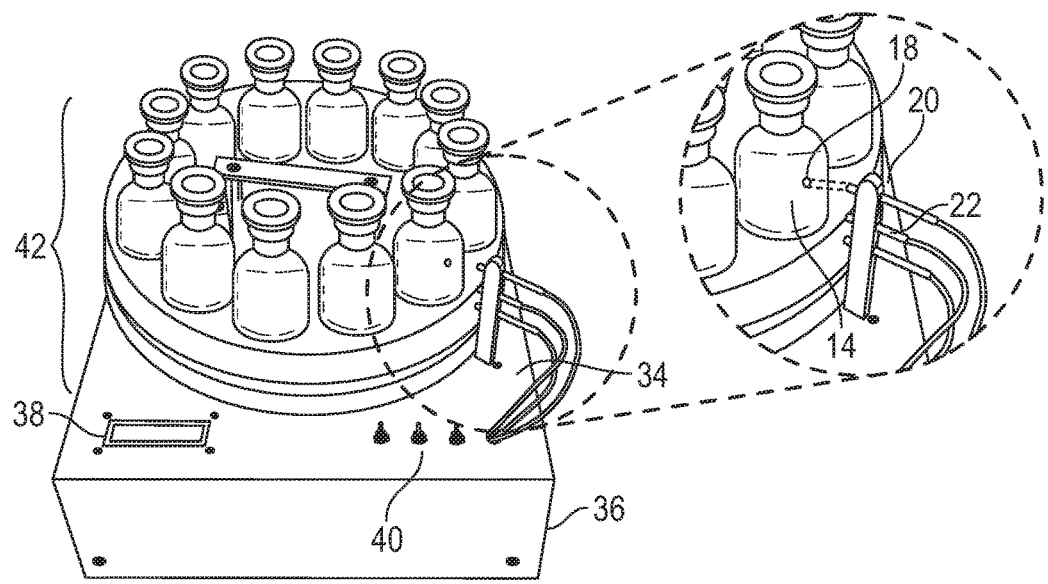
FIG. 2 shows one embodiment of the system with sample chambers arranged on a carousel to align with the signal detector and includes an exploded view of the signal detector 20 and the analyte detection site 18 located on a sample chamber 14.

Referring to FIG. 2, the system permits the operator to rapidly determine the concentration of an analyte present in a contained fluid sample 12. One or more sample chambers 14 are spatially disposed on a carousel or conveyer designed to rotate about a central axis. As the carousel rotates, each sample chamber 14 precisely aligns with a signal detector 20 which then measures a signal which is used to calculate a parameter of the analyte such as the analyte's concentration. Hereafter, the term "signal" refers to an electronic signal that is representative of the analyte concentration. The signal is transmitted to the electronics module 24 for processing.

In most cases, the inventive system is able to decreases test time to get an accurate analyte measurement. In many embodiments, the system is capable of measuring the analyte (e.g., DO) within 1 hour, 45 min, 30 min, 15 min, 10 min, 5 min, 2 min, 1 min, 45 sec, 30 sec, 20 sec, 15 sec, 10 sec, 5 sec, or almost instantaneously post-sample collection. However, for systems that measure an analyte rate (e.g. BOD, which is a calculated value based on dissolved oxygen at two different times), calculation of a meaningful analyte rate requires sufficient time to allow statistically significant reduction of analyte levels during the interval. Time required will vary dependent on the rate of degradation which likely relates to the initial strength of raw sample.

Figure 3:
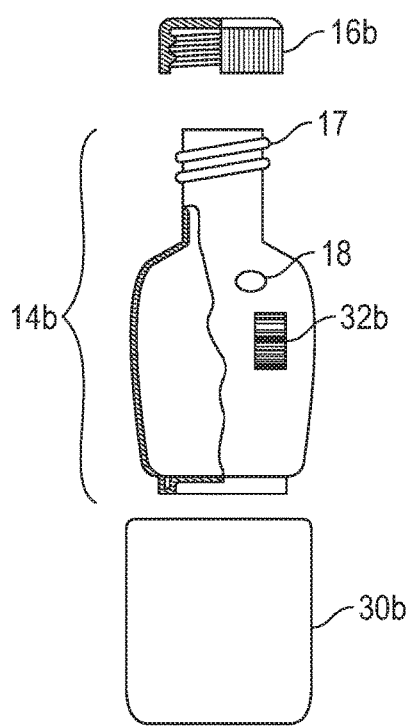
FIG. 3 depicts on embodiment of a sample chamber with a analyte detection site optode and barcode, a sealing device, and ambient light blocking sleeve.

Referring to FIG. 3, disposed inside the sample chamber 14 is a sample comprising the analyte. The sample chamber 14 is sealable to create an air-tight closure of the inlet which prevents exogenous gas from entering the sample chamber 14 when sealed and prevents the endogenous materials (either gas or liquid) from escaping.

Figure 4:
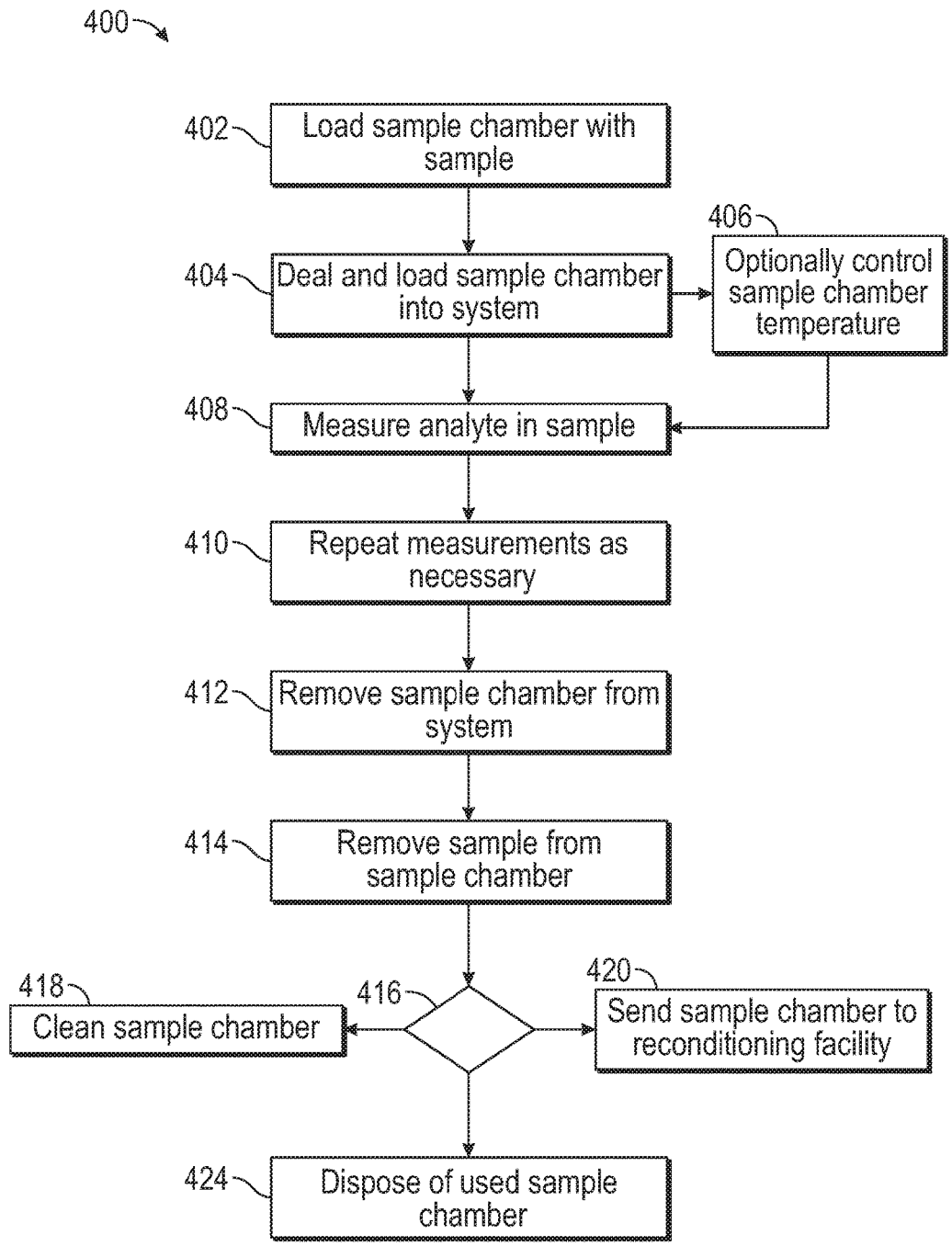
FIG. 4 depicts the sequence of steps used in one embodiment.
Figure 5:
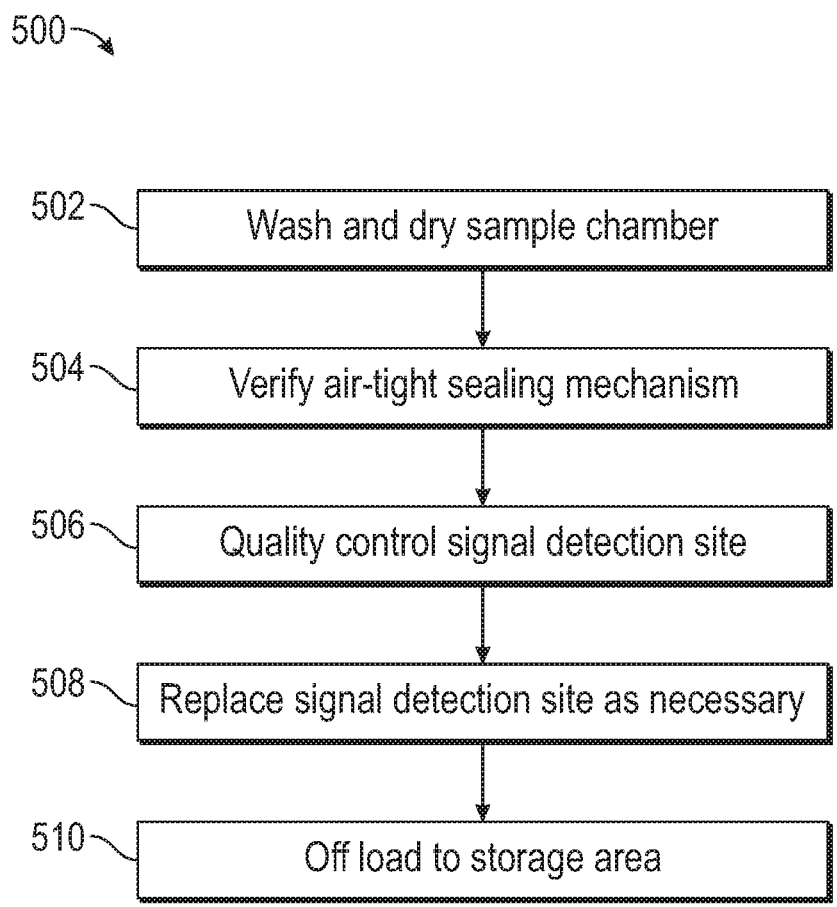
FIG. 5 depicts the step sequence for washing and re-certifying service for sample chambers 14.

FIGS. 4 and 5 present a sequence of steps involved in the process. Referring to FIG. 4, fluid samples 12 are loaded a sample chamber 14 and multiple analysis, over time are performed. Sample chambers 14 are removed and managed as necessary when no loner needed. Referring to FIG. 5, a sequence to service, reuse and recertify sample chambers 14 is presented.

Figure 6A:
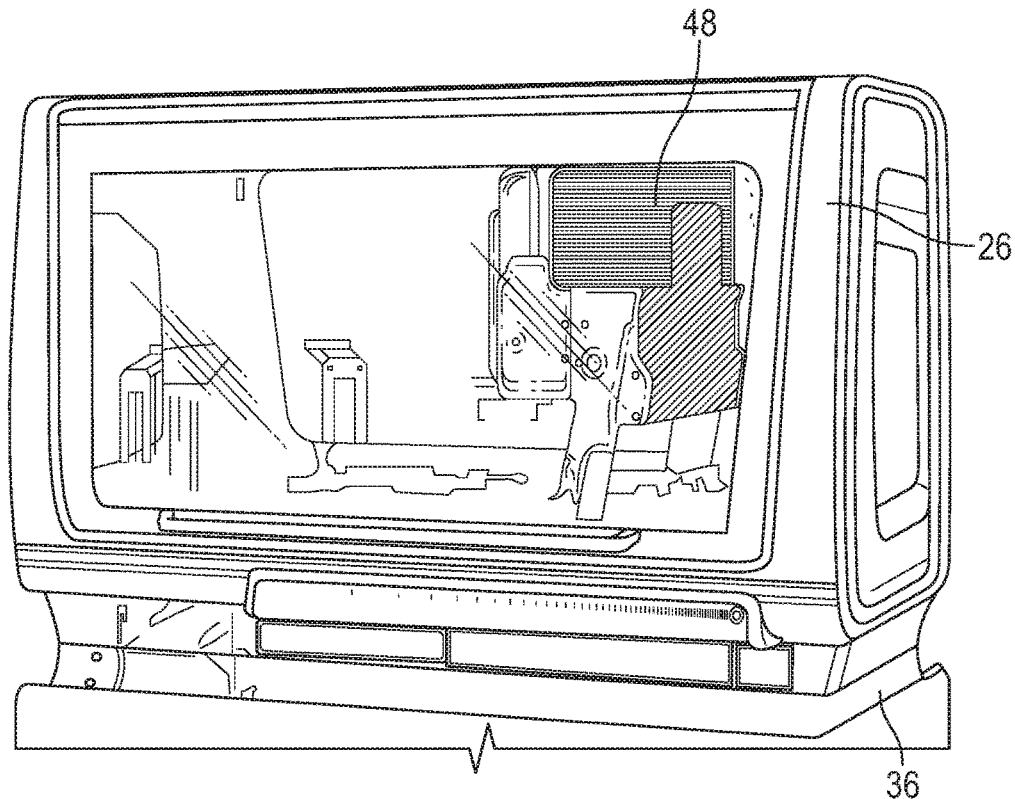
FIG. 6A depicts one embodiment of the system adapted for multiple, microtiter samples.
Figure 6B:
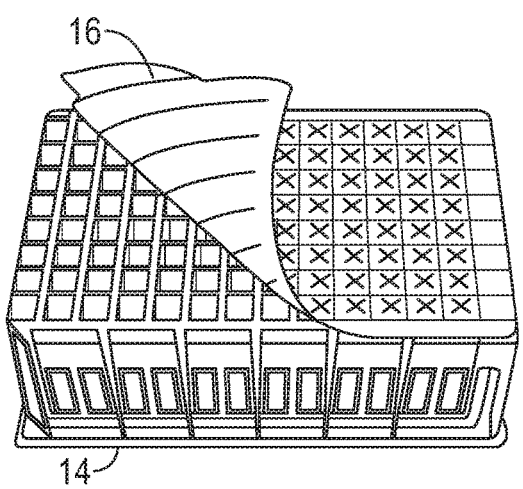
FIG. 6B depicts one embodiment of a multitier sampler chamber with an irreversible seal.

Referring to FIGS. 6A and 6B, in one embodiment, the sample chamber retainer comprises a controlled microtiter plate holder. In some embodiment, the microtiter plate holder is controlled by the drive motor. In other embodiments the system further comprises a robotic arm or automated workstation that controls the movement of the microtiter plate holder. Automated workstations for microtiter plates are commonly known in the art, and in one embodiment, comprises the Microlab NIMBUS system, which also serves as the sample transport mechanism 48, temperature control mechanism, and ambient light blocking means.

Figure 7:
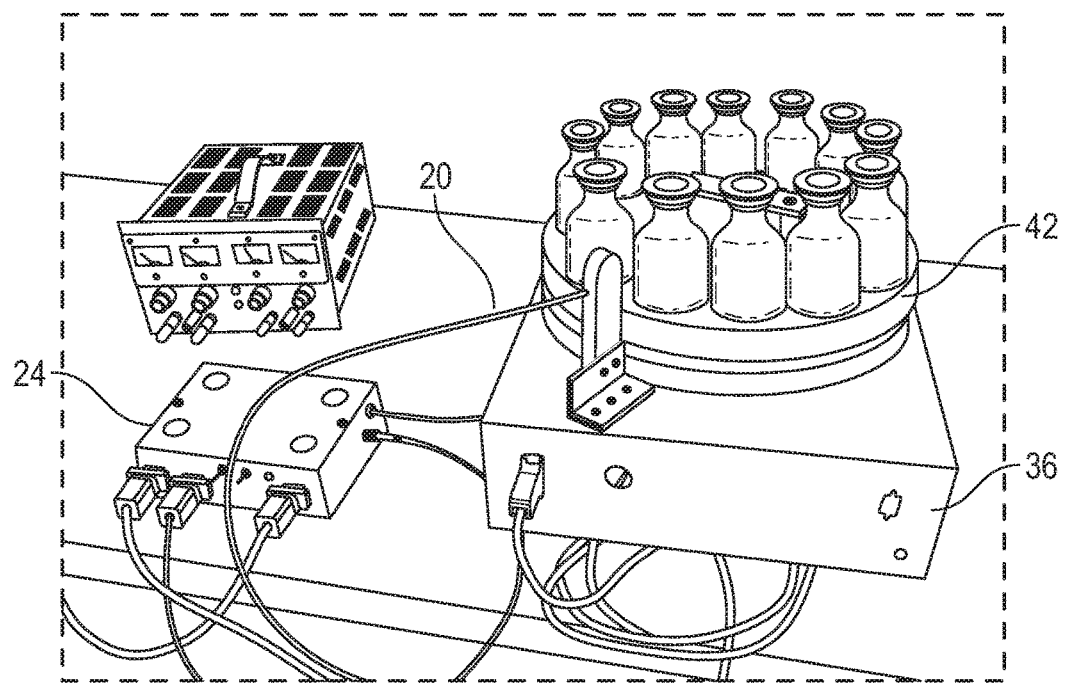
FIG. 7 depicts a rear view of the system using the carousel according to one embodiment.
Figure 8:
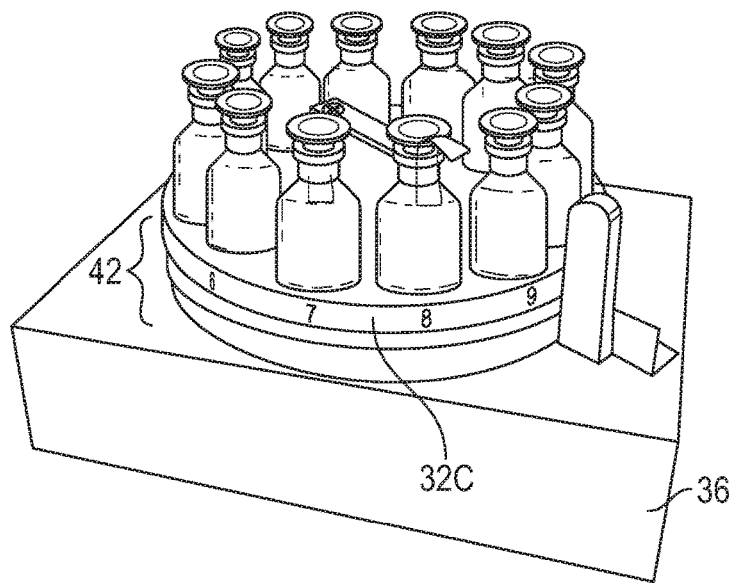
FIG. 8 shows a closer perspective of the system according to one embodiment.

FIG. 7 and FIG. 8 present additional views of some embodiments from various views. In these embodiments, sample chambers 14 are situated on a rotary sample chamber retainer 42 and are ready for analysis.

Samples and Analytes

The system takes one or more measurements of an analyte present in a sample disposed in a sample chamber 14, as described below. The analyte can be atoms or molecules, particulates, a microorganism (unicellular and multicellular), or a product of a microorganism in a fluid. The analyte is or has a chemical, biological, or physical property which can be detected as a signal when interrogated by the signal detector. In several currently preferred embodiments, the analyte is a gas such as oxygen, carbon dioxide, nitrogen, hydrogen sulfide, ammonia, methane, and any other gases dissolved in a fluid. In some embodiments, the dissolved gas relates to the determination of BOD. In other embodiments, the analyte is a heavy metal (e.g., silver, barium, lead, arsenic, chromium, cadmium, manganese, aluminum, copper), a pathogen, a pollutant (e.g., sterols, hormones), a hazardous substance (e.g., polychlorinated biphenyl (PCB), dioxins, plasticizers, flame retardants, microplastics) and the like that are a water quality concern.

The sample is any fluid, partially fluid, fluid mixture (e.g. a solution) or gelatinous substance that comprises an analyte to be measured. In most cases the sample is a substantially fluid or gelatinous substance meaning that the sample is at least 10%, 20%, 30%, 40%, 50%, 60%, 70%, 80%, 90%, 95%, and up to 100% fluid. Other materials may be present in the sample such as particulates, suspended matter, or sediment. The sample may consist of wastewater samples that contain residual, semi-solid material, referred to as sludge or biosolids, which is produced as a by-product during sewage treatment of industrial or municipal wastewater including different biosolid classes of Class A, Class A EQ (exceptional quality) and Class B. The sample may also consist of treated wastewater (i.e., effluent).

In most cases, the sample is unfiltered and may contain biological matter. However, optional filtering with a large pore filter will remove large particles from the sample. This optional filtering must use pore sizes selected to ensure that the microorganisms present in the sample are not filtered out, causing inaccurate results.

The present system in currently preferred embodiments measures multiple samples either in multiple dilutions of one sample, multiple samples from different regions of a facility, replicate samples, or a combination thereof. The sample is often collected from a source including wastewater for facility operation control, wastewater for release into the environment, wastewater inflow, seawater, fresh water, well water, lake water, bioreactors, ballast water, brewery effluent, and other sources of fluid as deemed suitable by one skilled in the art. In one embodiment, the sample contains living microorganisms capable of consuming or generating analytes to be measured. More specifically aerobic respiring organisms consume DO, combining it with an organic molecule to generate useful energy, and CO2 and water as by products. Analytes in embodiments designed to measure aerobic respiration, comprise of DO, CO2 and specific organic molecules, for example glucose.

Sample Chamber

The present invention comprises one or more sample chambers 14 that enable the system to hold and analyze the desired sample. One embodiment of a sample chamber 14 is presented in FIG. 3. The sample chamber 14 contains or otherwise constrains the sample to be measured. In the currently preferred embodiment, the sample chamber 14 maintains the integrity of the sample, preventing gas or other material from leaving, entering or mixing between the sample and the outside environment, once the chamber has been sealed. For the measurement of analytes relating to respiration or BOD, the sample chamber 14 is further absent of ambient or otherwise exogenous light. In preferred embodiments, the sample chamber 14 is comprised of any suitable material which is non-reactive to the analyte or signal measurement and has sufficient transparency to permit wavelengths of light from and to the signal detector to pass through the wall of the sample chamber 14. As it relates to this application, the term transparent either mean transparent, semi-transparent, or an opaque material including glass, plastic, quartz, polytetrafluoroethylene, polyvinylidene chloride, polysulfone, polypropylene, polycarbonate, and other biologically inert materials and further includes chambers that are transparent only over the analyte detection site, and otherwise non-transparent.

The sample chamber 14 typically have a volume of less than 10 L, though in some preferred embodiments the volume could be more and in others the sample chambers 14 are as small as about 1 mL or less. In other embodiments the sample chambers 14 are as large as about 50 L or more, depending on the application. In principle, the chambers may be configured to be any shape or volume.

In one currently preferred case, the sample chamber 14 comprises a 150 mL capacity, tapered cylinder glass bottle with a ground neck and matching glass stopper, as illustrated in FIG. 2. In further embodiments, the sample chamber 14 comprises a 50 mL plastic bottle with a threaded plastic cap. In even further embodiments, the sample chamber 14 comprises a sealable tube (e.g. a standard or modified test tube) constructed of a suitable material as described above. The dimensions of the sample chambers 14 may be constrained based on the physical parameters of a particular embodiment. In some cases, the sample chamber 14 may be tube shaped to allow loaded into a particular retaining mechanism (e.g. a rack), or may be constructed as a single, multi-sample holding well plate, otherwise commonly known as a microtiter plate (e.g. a Nunc A/S DeepWell, 1 mL capacity 96-well plate).

The sample chamber 14 in currently preferred embodiment are removable from the system and disposable. In almost all embodiments, the sample chambers 14 are removable from the system, although in certain embodiments (e.g. large volume systems), the sample chambers 14 may be physically constructed into the system. In still other embodiments, the sample chambers 14 are removable and reusable. Reusable sample chambers 14 are constructed to withstand standard cleaning procedures, as commonly known in the art. In other embodiments, the system further comprises a service to reuse and recertify sample chambers 14 as diagramed in FIG. 5. In these cases, the user would send the sample chambers 14 to the service, the chambers are washed, inspected, and calibrated for the analyte to be measured. Similar approaches with other containers have been disclosed in the art (U.S. Pat. No. 5,922,158 and U.S. application Ser. No. 15/601,441).

In some embodiments, the system provides a method to identify a sample chamber 14 and to associate its correspond temperature and analyte measurements with the sample chamber. In these embodiments, the system further comprises a sample chamber identifier 32, and an identifier reader 34, as illustrated in FIG. 2, such that the temperature and analyte signals are associated with the sample chamber identifier, and therefore the sample. The sample chamber identifier 32 may comprise any suitable tag or identifier as commonly known in the art, including but not limited to an attached or embedded electronic identifier tag, barcode, rotary encoder, a chip, or a predetermined order of sample chamber 14 loading, the specific order of signal measurement, or a combination thereof.

The sample chamber identifier 32 and the identifier reader 34 are disposed on or in the sample chamber 14 and the system, respectively, such that the reader will align and be able to read the sample chamber identifier 32 when the sample chamber 14 is in position to be read.

Sealing Mechanism

As illustrated in FIG. 2, one embodiment of the present inventive system provides a mechanism to seal the sample chambers 14 as desired. In many embodiments, before the analyte can be measured, the sample must be sealed away from the external environment. In the currently preferred embodiment, the analyte, BOD is the rate of change of DO concentration in a sample. If the sample were exposed to the external air, the concentration of DO overtime would be affected by the external air, and result in faulty measurement. Therefore, the sealing mechanism 16 seals the sample chamber 14, such that both the signal detector and thermal sensing mechanism are capable can read (e.g. measure the output signals) though the sample chamber multiple times without breaking the sample chamber's air tight seal.

As illustrated in FIG. 3, in one embodiment, the sealing mechanism 16 comprising a cap which matches the sampler chamber and seals the sample inside the chamber air-tight. The sealing mechanism 16 may comprise any suitable material or construction as commonly known in the art to form an air-tight seal with the sample chamber 14. In some embodiments the seal created by the sealing mechanism 16 is reversible. In other embodiments, the seal created by the sealing mechanism 16 is irreversible, permanent, or substantially permanent. Permanent seals as commonly known in the art include microtiter plate heat seals, category number 1814035, available from BioRad, Hercules, Calif., USA. Other permanent seals include hand-applied wax or adhesive. In one currently preferred embodiment, the sealing mechanism 16 comprises a glass stopper with a sample chamber 14 comprising a tapered, ground neck, as illustrated in FIG. 2.

In other embodiments, the sealing mechanism 16 comprises a screw cap matched to a sample chamber 14 with a threaded neck, most often constructed of a plastic polymer, as known in the art. In further embodiments, the sealing mechanism 16 is a cork, rubber or other synthetic polymer stopper matched to the appropriate sample chamber 14. In some embodiments, the sample chamber 14 is sealed when it is placed into the inventive system by the system's housing 26.

In further embodiments, the sealing mechanism 16 comprises a precision septa seal, a valve, cork or other stopper, wax, ball seals, and a solenoid-, pivoted-armature-, or rocker-driven valves. In each embodiment, the sealing mechanism 16 is selected to match the desired sample chamber 14.

Inlet Outlet Mechanism

In some embodiments, the sample chamber 14 further comprises an opening for filing and releasing fluid from the sample chamber 14. In other embodiments, the sample chamber 14 may have more than one opening with separate functions. In embodiments comprising an inlet outlet mechanism 17, the sealing mechanism 16 further acts to effectively seal, or make air-tight the sample chamber 14 and inlet outlet mechanism 17, if appropriate. In some embodiments, the inlet outlet mechanism 17 can add or remove sample within a sealed sample chamber 14. While the sealing mechanism 16 may be directly sealable at the connection to the sample chamber 14, it may also be sealable at any suitable position on the inlet or any suitable position on the outlet so long that no gases or liquids enter or are released once the sealing mechanism 16 is engaged or otherwise activated.

The sample chamber 14 inlet and outlets may be constructed in any fashion, as commonly known in the art. In addition, tubing or plumbing and pumping means (i.e., Sample Transport Mechanism, discussed following) attached to the inlet outlet mechanism 17 can facilitate the transfer of the fluid sample 12.

In an additional embodiment, the inlet and outlet mechanisms comprises a bottle opening and matching cap, for example a Restek Opt-Cap GL-45 bottle top with ⅛ inch diameter openings, and fitted with ⅛ inch outer diameter tubing. In this example, the sample chamber 14 comprises a matching, 150 mL threaded neck glass bottle. In such embodiments, the system further comprises a sample transport mechanism 48 to move the sample from the sample source 44 to the sample chamber 14, as described below.

In yet another embodiment, a means for filing a pre-evacuation sample chamber 14 is provided. In this embodiment, the system further comprises a filing system. The air or previous sample in a sample chamber 14 is removed by attaching the sample chamber 14 inlet to the filing system, and creating an air-tight seal at the inlet. The filing system's vacuum generator removes the sample chamber's 14 contents (e.g. air or old sample), and the filing system opens the back flow circuit. The back flow circuit enables the pressure between the sample chamber 14 and the sample source 44 to be equalized, releasing spring and opening the valve, allowing new liquid will flow into the sample chamber 14. The liquid (i.e. sample) stops flowing in the sample chamber 14 when the air back flow circuit is obstructed by inflowing sample. In some cases, a gas is further injected by the filing system to obtain the desired pressure and conditions inside the sample chamber 14. The injected gas comprises additional oxygen, carbon dioxide or an inert gas (e.g. diatomic nitrogen or argon). In this embodiment, the sample chamber 14 inlet outlet mechanism 17 comprises a single opening, and the read sample is removed from the inlet as described above.

Sample Transport Mechanism

The present inventive system provides a method for moving sample from a source to the sample chamber 14 and back out again. Some embodiments, as disclosed herein contain an inlet outlet mechanism 17 and/or non-removable sample chambers 14. As would be understood by a practitioner skilled in the art, certain embodiments are aided by further comprising a sample transport mechanism 48 (e.g. a means of conveyance include a pump and tubing) to move sample into and out of the system.

In one embodiment, the sample transport mechanism 48 comprises an automated pipetting system, which is capable of moving sample from the sample source 44 to the microtiter sample chamber 14. In some embodiments, after measurement in the sample chamber 14, the Microlab NIMBUS then moves the sample out of the sample chamber 14. In other embodiments the user removes the sample-loaded sample chamber 14 out of the system and places a fresh sample chamber 14 and/or a fresh sample source 44.

In some embodiments, the sample transport mechanism 48 comprises a pump, for example a GA Series micropump from IDEX Corp. A GA series micropump provides the ability to move 8.5 mL of sample per minute from a sample source 44 to the sample chamber 14. In embodiments with larger sample chamber 14 volumes, larger pumps may be used, as commonly known in the art. A pump sample transport mechanism 48 may be external to the system, or incorporated into the housing 26. In almost all cases, the sample transport mechanism 48 is communicatively controlled by the system's electronics module 24. As commonly known in the art, the sample transport mechanism 48 may receive electrical power from the system, or from a separate power source.

In still further embodiments, sample transport may be achieved by passive methods. More specifically in flow-through systems, a sample source 44 may have sufficient pressure, velocity, or wave-action to move a portion of the sample into the system, alleviating the need for a pump or other active sample transport mechanism 48.

Sample Chamber Retainer

The present invention relies on proper alignment of the analyte signal site in the sample chamber with the signal detector for a successful analyte measurement. To enable proper alignment, the system comprises a sample chamber retainer 42. In one embodiment, the system accepts a single sample chamber 14, and the retainer 42 accepts the sampler chamber when the chamber only fits in one orientation such that it is aligned with the signal detector 20. In further embodiments, the retainer 42 is constructed to have a tight fit on the sample chamber 14, so that when inserted and properly aligned by a user, the sample chamber 14 is constrained and will not move out of alignment during system operation.

In embodiments that contain more than one sample chamber 14, the retainer 42 is further configured to hold a pluraility of samples, such that each sample may be measured by one or more signal detectors (depending on the embodiment). In some embodiments, the retainer 42 further comprises a drive motor the enables the contained sample chambers 14 to be manipulated by the system. The sample chamber 14 retainer most often rests on the top of the system housing 26 and drive motor such that the drive motor can move the retainer 42, advancing sample chambers 14 to and away from the signal detector 20 for measurement.

As illustrated in FIG. 2, the sample chamber retainer 42 in the currently preferred embodiment is a carousel constructed above the housing 26, and multiple sample chambers 14 may be deposited inside the retainer 42. When placed in the retainers 42, the sample chamber's 14 movement is redistricted, such that the analyte detection site 18 will always align with the signal detector 20.

The present inventive system and the sample chamber retainer 42 provides the capability to measure more than one sample. In some embodiments, the system measures each sample in a sequential order. In such models, the sample chamber retainer 42 mechanism is most often a carousel or conveyer that rotates the sample chambers 14. The carousel is rotated to align an individual sample chamber 14 with the signal detector 20, the signal is measured, and then the carousel is rotated again to align and measure the next sample chamber 14.

A Thermal Sensing Mechanism

A key inventive concept to the present invention's accuracy is a substantially improved temperature sensing ability at the analyte detection site 18. Signal measurements of dissolved analytes are often impacted by very small temperature changes. Furthermore, the level of some dissolved analytes change depending on temperature, pressure and salinity. For example the solubility of oxygen (and therefore DO levels) decreases as temperature increases. Therefore, by measuring temperature concurrently with, and as close to the analyte detection site 18 as possible, the system allows for much more precise temperature measurements and makes the necessary corrections (e.g. $BOD_5$ temperature corrections).

The present invention comprises a thermal sensing mechanism 22 informationally connected at least the electronics module 24 and, in certain embodiments, the signal detector 20. The thermal sensing mechanism 22 enables the measurement of the thermal conditions while the signal detector 20 mechanism measures the sample signal at the analyte detection site 18. The thermal sensing mechanism 22 is capable of generating an associated thermal output signal. In the currently preferred embodiment, the thermal sensing sensor is an infrared sensor adapted to measure the analyte detection site 18 directly, through the sample chamber 14. In another specific embodiment, the thermal sensing mechanism 22 is adapted to measure the temperature of the sample chamber 14 at the analyte detection site 18. In another embodiment, the temperature sensor measures the internal temperature of the sample chamber 14. In yet another embodiment, the thermal sensing mechanism 22 measures the temperature of the sample proximal to the analyte detection site 18. In another embodiment the temperature is measured using a thermocouple or the like at or near the signal detection/generation location.

It is an aspect of the present invention to provide a sample chamber 14 and thermal sensing mechanism 22 that is enables measurement of a sample within a shorter time period after collecting and sealing the sample within the sample chamber 14 than other systems known in the art.

Temperature Control Mechanism

The physical and chemical properties of the sample are critical for accurate analyte concentration analysis. Particularly, when the analyte to be measure is a gas, the faction of a gaseous molecule dissolved in a fluid changes as temperature, pressure or other conditions (e.g. salinity) change. In closed environments the like envisioned for the present invention conditions such as salinity and pressure will not change significantly, however, temperature is highly dependent on the surrounding environment. In embodiments of the inventive system designed to measure BOD, thermostatic changes during the incubation period would cause significant fluctuations in measurements. Thermal sensing is one approach described above to account and correct for such fluctuations.

Thermal control is another aspect of the present invention which minimizes measurement error. The current 5-day BOD method, as known in the art, typically involves placing the sample in an air incubator or a water bath between measurements. In specific embodiments that benefit from constant temperature control, the system further comprises the optional temperature control mechanism 28 that can achieve and maintain a temperature range of the sample chamber, or sample chambers. Two primary temperatures are critical: 1) internal temperature of sample chamber 14; and 2) temperature at the analyte detection site 18. The temperature control mechanism 28, further comprising a heating control element, rapidly brings the sample chamber 14 to within a specified temperature range and maintains the temperature of the fluid sample 12. The temperature control mechanism 28 is further constructed to not obscure, block or otherwise impede the performance of the signal detector 20 mechanism or analyte detection site 18.

In the currently preferred embodiments, the temperature control mechanism 28 maintains the specified temperature range at an accuracy of at least ±5° C., preferably at least ±2° C., at least ±1° C., and in certain embodiments at an accuracy of within ±2/100th of a degree Celsius. The specified temperature for analyte measurement is preferably 10° C., 20° C., 30° C., 50° C., and in some embodiments, 100° C. In the case of 5-day BOD calculating systems, the preferred specified set point temperature is 20° C.

In a currently preferred embodiment, the temperature control mechanism 28 comprises a heating coil constructed to fit into the housing 26 interior. The heating coil may be constructed of any suitable material, commonly known in the art, and most often of copper wiring. The heating coil adjusts the internal temperature of the housing 26 to the specified temperature range which then heats the samples inside the sample chambers 14 to their specified temperature. In an additional embodiment, the heating control element controls the temperature of a platform affixed beneath each sample chamber 14. In other embodiments, a heating control element is disposed on the external surface of the sample chamber 14. In another embodiment, the heating control element is a probe or a heated cap in fluidic contact with the sample in the sample chamber 14.

In embodiments with a temperature controlled platform underneath the sample chamber, the temperature control mechanism 28 can be constructed to fit standard microtiter multiwell plates. The heat-conducting plate temperature control mechanism 28 may be constructed of any suitable material, most commonly aluminum alloys, and constructed to fit snuggly around a standard micro-titer plate, most commonly approximately 85.5 by 125 by 10.4 mm. In cases of deep-well micro-titer plate constructions, the temperature control mechanism 28 extends vertically to 50 mm.

In another embodiment, the temperature control mechanism 28 comprises a tube heat exchanger. Tube heat exchanger embodiments, the temperature control mechanism 28 comprises a heating fluid, heating element, and at least two sets of tubes. The first set of tubes contains sample fluid, and is fluidly connected to the sample by either the inlet outlet mechanism 17 or by the sample chamber 14. The second set of tubes contains the heating fluid. The first and second sets of tubes are brought within close proximity of direct contact, less than 1 mm, within 2 mm, within 3 mm, within 4 mm, within 5 mm and within 1 mm distance between individual tubes. Heat is exchanged between tube sets when at close proximity. Heating tubes of the second set of tubes are constructed to lead away from the first set of tubes to a heating element, as known in the art, where the heating fluid receives heat from the heating element.

In another embodiment, the temperature control mechanism 28 comprises a microchannel heat exchanger. In these embodiments, the temperature control mechanism 28 comprises, a heating fluid, heating element, and at least one set of tubes. The first set of tubes contains heater fluid in confined channels of less than 1 millimeter (mm) in diameter. The channels are constructed of any suitable material as known in the art, including metal, metal alloys, ceramic and specialized plastic polymers. In some embodiments, the microchannels are exposed directly to the sample. In other embodiments, the sample chamber 14 and microchannels are constructed to fit snuggly together, in any suitable configuration, but most often in a corkscrew shape.

Ambient Light Blocking Means

For the measurement of analytes relating to respiration or BOD, the sample chamber 14 should be absent of ambient or otherwise exogenous light. In some embodiments, the sample chamber 14 is placed inside a dark housing 26 wherein light is not permitted when the system is in operation. Is one embodiment, blocking means includes: a bottle wall or sleeve on the holder around the instrument, instrument covers, and sample compartment within the instrument, particularly in the solid state model.

In many preferred embodiments, the analyte measurement is significantly impeded by ambient electromagnetic radiation. In many cases, the presence of visible light changes the levels of analytes over time. When the desired measurement is the rate of change of an analyte (e.g. BOD and respiration), ambient light or other electromagnetic radiation alters DO levels over time. In these embodiments, the system further comprises an electromagnetic radiation blocking mechanism, designed to block at least a portion of the electromagnetic spectrum. These embodiments are further constructed to not emit or otherwise create electromagnetic radiation from the various components of the system.

In one currently preferred embodiment, the ambient light blocking means 30 comprises a sample chamber 14 sleeve. The sleeve is usually constructed to fit snuggly around the sample chamber 14. Some embodiments further include a cover that removably covers the sample chamber 14 when closed. The preferred ambient light blocking means 30 is constructed to be further automated. In these cases, the blocking mechanism is informationally connected to the electronics module 24 and further comprises an actuator to open and close the mechanism. In another preferred embodiment, it is constructed into the housing 26, as described in more detail below.

In another embodiment, the ambient light blocking means 30 comprises a sleeve or box constructed around the system, existing outside the housing 26. In the cases when the ambient light blocking means 30 is outside the housing 26, it may comprise an incubator, a dark room, a room or other structure devoid of any light. In another embodiment, it comprises a sleeve around the sample chamber 14, such that it moves along with each sample chamber 14 when the retainer 42 moves.

All of the specific embodiments of the ambient light blocking means 30 described above, can be constructed to block different portions of the electromagnetic spectrum. In the currently preferred embodiment, the ambient light blocking means 30 is constructed to block visible and near visible electromagnetic radiation, preferably ranging from 400 to 700 nm. In these cases, the ambient light blocking means 30 may be constructed of any suitable material, as commonly known in the art, most often, opaque plastic.

In other embodiments, the ambient light blocking means 30 is constructed to block ultraviolet electromagnetic radiation, blocking 10 nm to 400 nm wavelight light. In further embodiments, the light blocking means blocks infrared radiation.

Signal Detector

The presently described invention comprises a signal detector 20 that is responsible for receiving the corresponding analyte output signal, and in some embodiments, stimulating an input analyte signal. The portion of the signal detector 20 that produces the signal is referred to as the analyte signal stimulator. This signal is directed at the aligned analyte detection site 18, where the input signal is converted to the analyte output signal at the analyte detection site 18. The signal detector 20 then further receives the output signal. The analyte output signal enables the inventive system to precisely measure the concentration of an analyte.

In the currently preferred embodiments, the input and output signals are of fluorescent nature; that is the system relies on an analyte signal stimulator that emits a wavelength of light that can be absorbed by a substance and re-emitted as a light of a second wavelength. The signal detector physically contains the components to emit the input signal at a first wavelength of light and to detect the output signal at a second wavelength of light. In these cases, the signal detector comprises a fluorometric system with an excitation capacity and the ability to measure emission from the analyte detection site. In the currently preferred embodiment, the signal detector comprises a blue light source, an optical fiber and a red light detector. In other embodiments, and depending on the analyte to be measured, the input and resulting output signals may be of other wavelengths, such as red and infrared, respectively. In most embodiments, the signal detector components are constructed as a single physical piece, but it is understood that the light source and the detector may be in different housings, as long as the light signals are properly positioned.

The signal detector 20 measures a signal relating to an analyte parameter may pertain to the detection of the analyte (i.e. presence), changes in the analyte composition, concentration, bond-length, structure, or activity of the analyte, such as growth, metabolic activity, or lack thereof due to pollutants or toxins in the sample. The signal detector 20 measures the signal at the analyte detection site 18 which, in preferred embodiments comprises an oxygen sensor spot by inputting a specific wavelength of light to the analyte detection site 18, and detecting the corresponding fluorescence output signal. The input and output signals are most often sent and detected using a fiber optic cable coupled with a photodiode. Other suitable signal detectors 20 are acceptable if adapted to measure the signal or produce a detectable output signal from the analyte signal site.

The present inventive system provides the capability to measure more than one sample. In some embodiments, the system measures each sample in a sequential order. In such models, the system further comprises a sample chamber retainer 42 mechanism, as described above. In embodiments using a carousel or conveyer to rotate the sample chambers 14, the carousel is rotated to align each sample chamber 14 with the signal detector 20, the signal is measured, and then the carousel is rotated again to align and measure the next sample chamber 14. In an embodiment using the solid state configuration, a manipulator comprising the signal detector 20 moves to each sample chamber 14 and measure the signal of the analyte. In a related solid-state embodiment, the system utilizes more than one signal detector 20, preferably a signal detector 20 assigned to each sample chamber 14 so that more than one chamber can be measured in faster sequence or simultaneously.

Analyte Detection Site

The analyte detection site is the component of the system that catalyzes or otherwise converts the input signal into the corresponding output signal. The analyte detection site 18 most often comprises an optode spot adhered to the interior of the signal chamber. Functionally, the analyte detection site 18 is where the output signal is generated or at least capable of being interrogated for a signal.

In further embodiments, the analyte detection site reacts with an analyte to produce or otherwise facilitate an output signal without any input signal. In these cases the analyte detection spot reacts with an analyte to produce a phosphorescent, bioluminescent, chemiluminescent or fluorescent signal, often as a chemical reaction between a catalyst and the analyte where the product of the reaction produces a readable signal.

In most of the preferred embodiments, the analyte detection site 18 comprises an oxygen optode which generates a fluorescent light emission signal based on a reaction involving itself, the analyte and the input signal. The optode, also referred to as optode spots, are ideal for their consistent measurements, and ability to be measured from within a sealed sample. In some embodiments, the optode reacts to only a specific analyte or analytes. Analyte specific optodes are commonly known in the art, for example, in one embodiment, the analyte detection site 18 comprises a nitrite specific optode as described by S. Yang Anal Chim Acta, 843 (2016). In other embodiments, the detection site may also or alternatively comprise an interface suitable of sustaining, catalyzing, or otherwise enable a measurable chemical reaction.

In embodiments with multi-well sample chambers 14, the analyte detection site 18 is preferably the bottom of each well in the sample chamber 14. The analyte detection site 18 of the present invention is scalable and can be constructed to fit in the standard multi-well sizes. For example, in an embodiment, the analyte optodes are specific for heparin and comprise a paste that is either deposited into a multi-well plate or screen printed in a pattern matching a multi-well plate well pattern, air dried and affixed to the multi-well sample chamber 14, as known in the art (S. B. Kim, Anal. Chem. 70, 4860-4863, (1998) and K. Billingsley, Anal. Chem. 82, 3707-3713).

In certain embodiments, the analyte detection site 18 is the position on the sample chamber 14 including the side of the chamber, the cap of the chamber, the bottom of the chamber, the lower half portion of the chamber, the upper half portion of the chamber, and any other suitable position on the sample chamber 14 which can provide an adequate signal relating to the analyte of interest.

In some embodiments, the analyte detection site 18 is the position of a sensor spot on the sample chamber 14. These sensor spots, such as an optical oxygen sensor spot are small, their signal is independent of flow rate in the sample chamber 14, and can be disposable. In the currently preferred embodiment, the analyte detection site 18 comprises a non-invasive SP-PSt3-NAU optode spot, commercially available from PreSens, Regensburg, Germany. The SP-PSt3-NAU optode spot has a measurement range of 0 to 100% oxygen in dissolved or gaseous phase, comprising a 125 micrometer, flexible and transparent polyester foil. These optode spots consumption no oxygen during measurement, are signal-independent of flow velocity, and provide a detection site through the sample chamber 14 wall, without breaking the sample chamber air tight seal 16.

In other embodiments, the analyte detection site 18 is provided by securely integrating a probe to act as the analyte detection site 18 through the sample chamber 14 or the cap of the sample chamber which interacts with the fluid sample 12. Other analyte detection sites 18 may also be used so long that the sample maintains an air-tight seal during the incubation period. In preferred embodiments, disposable with optode and a neck sealed with a screw, or cork. In addition of measuring the analyte signal at the analyte detection site 18, a second signal may be measured at the same position to further enhance the accuracy of the system by using the second measurement of relating variable concurrently.

Electronics Module

The analytical measurement system of the present invention features an electronics module 24 to support the operational control of the system and perform analyte calculations. The electronics module 24 receives the signal from the signal detector 20 and performs any necessary calculations to determine the analyte concentration in the sample. The electronics module 24 also provides capabilities for data handling, processing, storing and display 38, as required. In some embodiments, the electronics module 24 also comprises the power supply for the system. In other embodiments, the system receives power from standard electrical connections, most often in the form of a standard, external voltage outlet and a plug connected to the electronics module 24 as commonly known in the art.

The electronics module 24 receives a signal measured by the signal detector 20 relating to an analyte concentration in a sample. In addition to calculating the concentration of the analyte, the electronics module 24 may store the signal and/or calculation, transmit the signal/calculation to another source, or a combination. In certain embodiments, the electronics module 24 receives one or more other signals, such as a signal pertaining to temperature. The electronics module 24 is generally comprised of a controller, an operator interface, and a power supply.

The control and data acquisition functions are handled by the controller, often by an embedded processor or central processing unit (cpu) with short- and long-term memory storage, as commonly known in the art. In some embodiments, the electronics module 24 may be in an external enclosure. When constructed in an external enclosure, the electronics module 24 is at least communicatively connected to the system. In further embodiments, the external electronics module 24 is also electrically connected to the system.

In the currently preferred embodiment, the controller controls system timing, sample chamber 14 movement, the signal detector 20, data acquisition, real-time data analysis and display functions. In the currently preferred embodiment, the controller and electronics package are located inside the system housing 26. In some of the preferred embodiments, the controller comprises a Raspberry Pi 3 Model B, a single board computer.

In some embodiments, the system may be communicatively connected to an external computer for higher level analysis functions. The controller is designed to provide at least sample chamber 14 and signal detector 20 control. In embodiments with an external computer, the external computer controls timing, data acquisition, real-time data analysis, and display functions.

Out Put Signal Transformation for Computation.

Solubility of many analytes depends heavily on sample temperature. Therefore, the inventive system measures the sample's temperature at the analyte detection site 18. The analyte and temperature signals are sent to the electronics module 24 and provide computational input for the system to make corrections as necessary, based on the analyte measured and the effects of temperature on the analyte output signal. The compensation method will differ for embodiments measuring different analytes. In the currently preferred embodiment, when the analyte is DO, the system makes the necessary correcetions, including those defined in the standard BOD method. In almost all embodiments, the analyte and temperature signals will provide input to the electronics module 24 to determine at least one parameter of the analyte.

Drive Motor

The present invention provides for the system to comprise of multiple sample chambers 14 for concurrent sampling. In embodiments that contain more than one sample chamber 14, the system further comprises a drive motor the enables the sample chamber retainer 42 to move the sample chambers 14 between measurements, such that one sample chamber 14 is moved away from the signal detector 20, thermal sensing mechanism 22 and sample chamber identifier reader 34 and another sample chamber 14 is moved into alignment.

Housing

A housing 26 is generally provided which encompasses the system described herein. The housing 26 enables optimum and constant temperature control, physically contains the components described above and protects the components from any adverse environmental conditions. In other embodiments, the housing 26 provides an environment devoid of light for the signal measurement. In additional embodiments, the housing 26 maintains temperature and prevents light from interacting with the sample chambers 14. At a minimum, the sample chambers 14 are disposed, at least partially within the housing 26. Specifically, in some embodiments, a portion of the sample chambers 14 insert into the housing 26, as illustrated in FIG. 2. In these cases, portions of the sample chamber 14 remain outside the housing 26. In some embodiments the sampler chambers are wholly contained inside the housing 26. In these embodiments, the housing 26 is releasable fastened, such that the housing 26 can be opened and closed by either a user or automated by the controller. In general, the housing 26 is comprised of a material to assist the temperature maintenance. The housing 26 may contain additional material such as insulation for temperature maintenance which may be fully or partially lining the interior of the housing 26 or conversely the external surface of the housing 26.

In other embodiments, when the sample chambers 14 do not require a housing 26 to maintain temperature, the sample chambers 14 are exposed to the environment and the ambient temperature and light.

Base

According to some embodiments, the system further comprises a base 36 that supports the system's components, including the housing 26, sample chamber 14, drive motor, sample chamber retainer 42, signal detector 20 and any present optional components described above.

Example 1: Carousel System

Wastewater treatment facilities are under pressure from government officials and taxpayers to limit their cost and run as efficiently as possible. Current methods for measuring BOD require a sample to be collected, transported, processed, measured, incubated for 5 days, and then measured again. This means that facility managers are not made aware of facility performance issues until five days after sampling. Plant managers must then wait an additional five days for feedback on any corrective actions taken at the facility. A shortened turnaround time on results would allow plant managers to make quicker and more informed decisions about treatment processes saving time, resources, and money. As a test that many wastewater treatment facilities conduct on a daily or weekly basis, the present system could save municipalities substantial amounts of energy. BOD measurements are required to meet regulatory requirements, but they also provide a potent indicator of facility performance.

The system provides a method to continuously measure concentration of oxygen in the sample an given two appropriately paced reads will provide a measure of the microbial consumption rate of oxygen in a fluid sample 12, specifically wastewater in this example. The system incubates one or more samples typically for 5 days, as per the current EPA regulations but is also being able to supply BOD rate data in vasty shorter timeframes. Because the system does not change the basic chemistry or principles behind the current BOD method, the system is compatible with EPA standard procedures for establishing new methods. The system employs continuous oxygen monitoring, automated sample handling, and predictive software to provide less than five day BOD data. It also yields the standard 5-day BOD data. Wastewater treatment plant managers can then use this information to more tightly optimize their treatment process, which will save energy across the over 16,000 treatment plants in the United States.

The system can be divided into six key components; an oxygen sensing element, sample bottles, a carousel, a temperature control mechanism 28 (e.g., incubator), a computer/operator interface, and a power source. The primary oxygen sensing element is a non-invasive optode which is a laser-based optical oxygen sensor comprised of an optically active chemical element that is contact with the water sample. The oxygen sensing element (such as a 1 cm diameter film spot) is excited by an external laser source. The resulting fluorescence signal is transmitted via fiber optic cable to a signal detector 20 (e.g., photodiode) to determine amplitude and phase delay which are proportional to the dissolved oxygen in the sample. When the temperature of the sample is maintained at a stable value, highly precise measurements of oxygen can be obtained at a frequency of better than 1 Hz, 2 Hz, 4 Hz, and up to 10 Hz or more.

The system continuously reads the oxygen levels with a tiny sensor that is permanently fixed inside the sample chamber 14 (e.g., bottle). This sensor is the commercially-available PreSens precision sensing system, which comprises several sensor optode spots, for differing amounts of expected oxygen saturation and is illustrated in FIG. 2. The SP-PSt3-NAU optode spot that reacts differently depending on how much oxygen it comes in contact with. The spot is excited with blue light through the walls of the glass bottle (sample chamber 14), and the resulting red light fluorescence of the spot can be translated to the amount of oxygen contacting the sensor. The system sample handling and software yields a continuous measurement of the oxygen levels inside the closed sample, and thus there is no need to open the bottle. Because the depletion of oxygen happens on a fairly steady linear scale, the data is extrapolated using integrated software to predict the dissolved oxygen drawdown 5 days henceforth. Essentially, the rate of oxygen depletion over the course of a few hours of an incubation is very similar to the rate of oxygen depletion over the course of 5 days. Thus, by continuously monitoring oxygen, the system can convert the rate to units equivalent to the EPA-accepted 5-day BOD, and report these results in a useful timeframe (i.e., after incubation a few hours or less).

For one particular model, the processing of samples involves loading up to 12 bottles onto a 12 inch diameter tray that is then placed onto a carousel table that can continuously rotate. Each 125 ml sample bottle has an internal optode spot that faces outward from the center of the tray. After loading all the bottles and when commanded by the operator, the carousel rotates to a home position which is midway between Bottle #12 and Bottle #1. The carousel then rotates clockwise and carefully aligned until the first optode spot is detected by the signal detector 20 (optode laser and photodiode). An edge detection plus amplitude maximum determining algorithm is used center the spot to return the best signal. Measurements are made at a rate of 1 Hz rate or more, and typically 50 measurements are made on each bottle to improve sampling statistics. At the end of a sampling interval, the carousel advances to the next bottle. An absolute rotary encoder in the base 36 of the carousel table provides a positive bottle number reading, and serves in this embodiment as the sample chamber identifier reader 34. A transit to the next bottle takes on the order of less than 1 minute, so with acquisition of the spot, transit, and sampling the total time for a revolution is less than 30 minutes. The bottle to bottle sampling interval can free run or be commanded to follow a uniform time spacing (i.e., 5 minutes per bottle mode).

Figure 9:
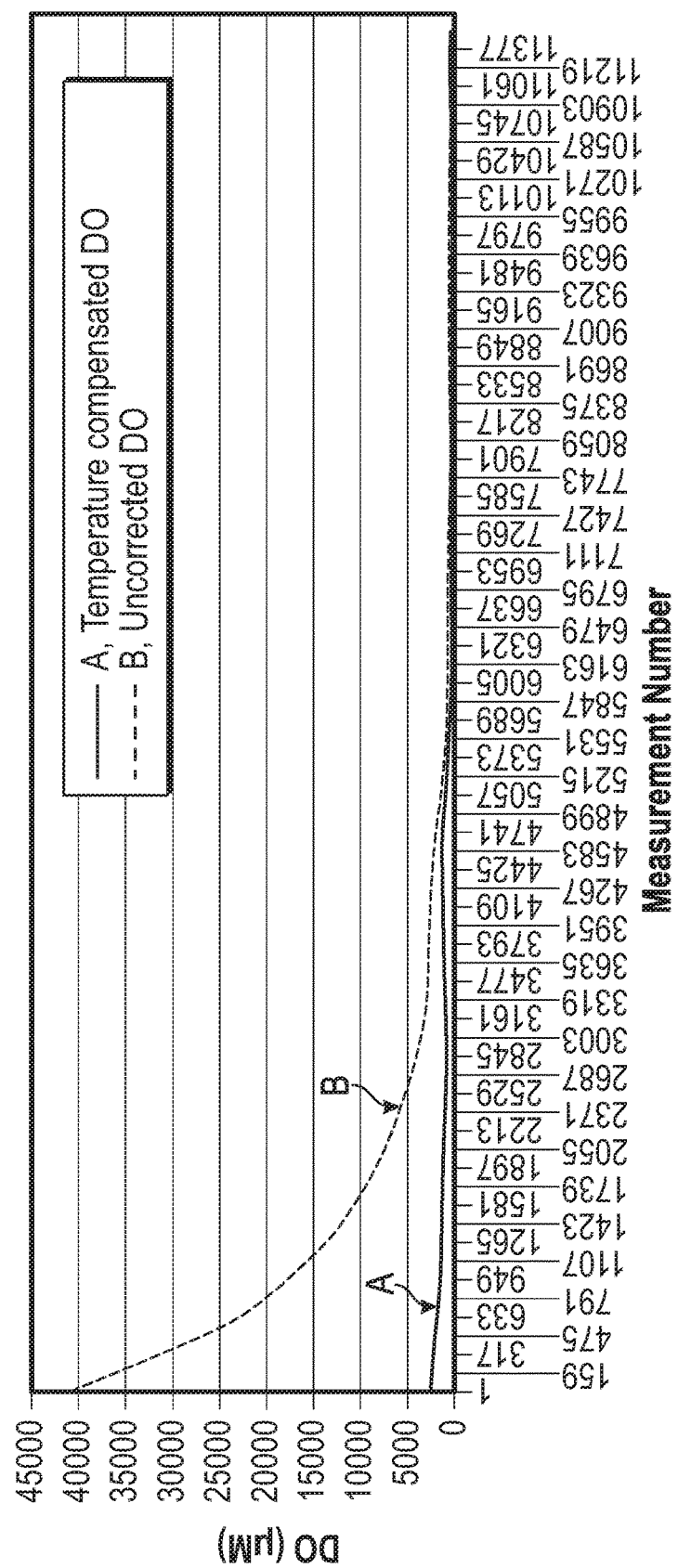
FIG. 9 shows a graph of how the use of an optical IR temperature sensor removes the initial error encountered after the start of the system until the sample bottles reach their normal thermal equilibrium approximately 4 hours later.

A representative chart of temperature and oxygen concentration of the system's first 8 hours is illustrated in FIG. 9. The output signal measured by signal detector 20 is depicted on the Y-axis as molar DO levels and measurement number is depicted on the X-axis. The carousel system was set to measure 12 bottles, with each bottle being measured 60 times in 30 minutes, for a total of 1440 samples per hour and a measurement taken once every 2.5 seconds (0.4 Hz). The uncorrected DO measurement is shown as the dashed line, further labeled A. Overtime, as the temperature of the sample chamber 14 equilibrates (as it receives heat from the temperature control mechanism 28), and the DO concentration appears to drop substantially. However, when the system takes in to account the temperature of the sample at the analyte detection site 18, the electronics module corrects for temperature and produces compensated DO concentration (solid line). The corrected DO concentration is much more stable, and the BOD rate was calculated from this calculation in thirty minutes, as apposed to the 3.5 hours required without temperature measurement for the data to become statistically valid.

The key to the present inventive system is that the corrected line can be used to further calculate BOD, before the temperature of the sample reaches equilibrium. Temperature equilibrium occurs when the dashed line reaches steady state, approximately at measurement number 3003.

The prototype system includes multiple components including a carousel, base (turntable, motor, and rotary encoder) and a separate box that contains the laser and processor electronics. A data processor (e.g., a notebook or tablet computer) and power supply are also external. In one embodiment the electronics are consolidated into the base 36. The power supply and computer will remain external. The entire system is housed in an incubator that acts as the temperature control mechanism, to hold the temperature constant.

The control and data acquisition functions are handled by an embedded processor in an external enclosure. The higher level analysis functions may be performed on an external computer or adapted to process with the embedded processor. Optimal processors provide low order motor and laser control while the computer will control timing, data acquisition, real time data analysis, and display functions. With this design, a system can be reliably placed at a wastewater treatment plant to be operated with minimal training.

Example 2: Solid-State System

Figure 12A:
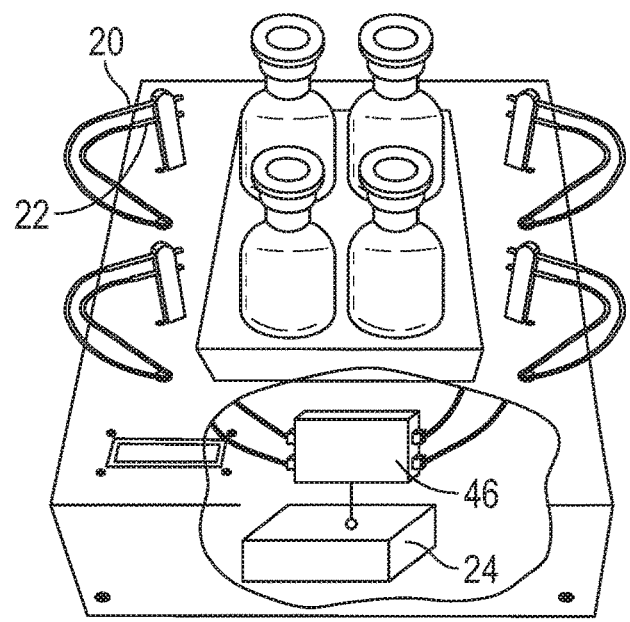
FIG. 12A depicts an embodiment of a solid-state system with multiple signal detectors each focused on a sample chamber.
Figure 12B:
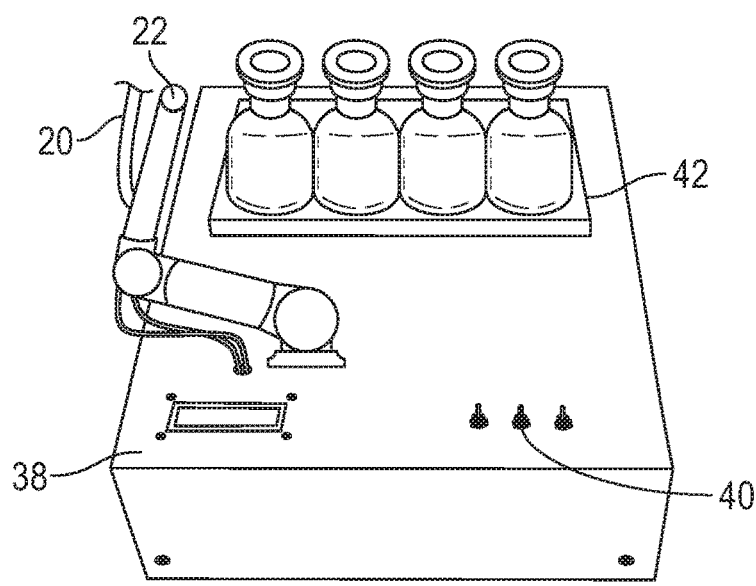
FIG. 12B depicts an embodiment of the system with a movable signal detector.

In this example, the system forgoes the use of a mechanical device (e.g., carousel or a conveyer) to align and/or orient the sample chambers 14 and analyte detection site 18 with the sample detector and instead employs stationary sample chambers 14. To measure the signal associated with each chamber, one of several options is possible. In one embodiment as illustrated in FIG. 12A, the system further comprises a movable signal detector 20 arm that most often comprising a fiber optic which moves to each chamber, aligns with the sample detection site, and measures the signal. In another embodiment as further illustrated in FIG. 12B, the system comprises multiple signal detectors 20, and each signal detector 20 aligns with a different analyte detection site 18 in or on a corresponding sample chamber 14. Each signal detector 20 is then connected to the electronics module 24 by way of a multiplexer 46 that switches between each analyte signal output from a signal detector 20 and forwards the signal through a single line to the electronics module 24 while identifying the originating signal detector 20. Signals from individual sample chambers 14 are measured and monitored under control of the electronics module 24 and its associated software.

Example 3: Flow-Through System

In this example, the system is adapted for in situ real-time metabolic monitoring of biological wastewater treatment, aquaculture, and/or natural waters and waterways. One embodiment of this system is presented in FIG. 10. The system can also be used as an early warning detector of toxic release and spills through its capability to detect reduction of biological activity in fluid. The system may also be used as an estimator of the restored health of an aquatic ecosystem. The flow-through system measures an analyte, such as dissolved oxygen for BOD measurement by providing the system in-line with the plumbing providing the fluid sample 12. The system takes the wet chemical analyses out of the BOD measurement, which will reduce costs and eliminate many sources of error.

The in-line flow through system allows oxygen measurements to be taken continuously, in an automated manner, and at the sample location itself. BOD can be calculated based on comparison of oxygen in initial and subsequent analytical results on the same fluid sample 12. This method saves more time and man-hours while providing more accurate and timelier data. The flow-through system will also be integratable with a facility's Supervisory Control and Data Acquisition system, or SCADA, which are used to control and adjust the treatment process in many plants. While the operation is designed to be automatic, it may also be externally controlled by an operator.

This system is capable of providing BOD data in a way that the industry has not seen before and will revolutionize a measurement that has gone largely unchanged for over a century. Timely BOD data from multiple locations throughout a plant would allow managers to more effectively and efficiently treat wastewater. This includes: 1) forecasting facility demands based on the BOD of the influent coming into the facility; 2) adjusting parameters (e.g., aeration levels) based on the BOD at different points in the treatment process; 3) gauging the overall performance of a facility by providing BOD of effluents; and 4) monitoring BOD values of influent at pump stations and other locations further away from the plant to allow more time for system preparation or for pre-treating the wastewater in the sewer system as it approaches the plant. With such an emphasis being placed on both clean water and reducing power consumption, the flow-through is likely to make a large impact in the environmental cleanliness of wastewater treatment facilities.

The system operates by imbibing fluid through an inlet port, either passively or actively, capturing a fluid sample 12 into the sample chamber 14, sealing the sample chamber 14, incubating the sample, measuring one or more signals relating to the analyte of interest, (dissolved oxygen in this case), and releasing the sample through an outlet port. In some embodiments, the chamber is a tube comprising an optode spot, and the optode spot is attached to a surface or side of a vat or attached externally to the side of a submersible robotic device. In these configurations, a seal on the sample chamber 14 may open directly to the liquid environment, capture a sample (in some cases the velocity for sample entry into the chamber is provided by movement of the submersible device), and then recloses to re-establish airtightness, and then analyte is detected/measured.

Figure 10:
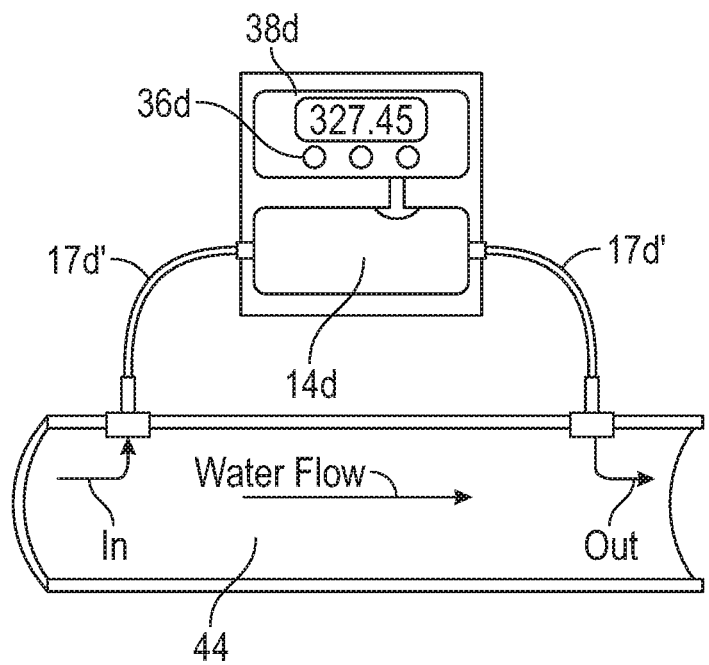
FIG. 10 depicts an embodiment of a flow-through system integrated with the plumbing.

Shown in FIG. 10, a sample chamber 14 is operatively coupled with a signal detector 20 to read the signal relating to the dissolved oxygen measurement. A fluid sample 12 flowing through the water pipe is imbibed through the inlet port and through the channel connected to the sample chamber 14. The fluid sample 12 is then sealed within the sample chamber 14 and incubated in the absence of ambient light while the signal detector 20 performs the measurements. Once the desired measurements have been performed (or the incubation period has ended), the fluid sample 12 is removed from the sample chamber 14 either passively by flowing through the outlet channel and outlet port by the gravitational force or actively by a pumping mechanism. The fluid sample 12 is then generally returned back to the water pipe from which it was sampled from; however, it is also envisioned that the fluid sample 12 may be transferred to another container for storage and potentially additional water testing or transferred to a second water pipe separate from where the sample was derived. In such embodiments, an optional second outlet port and channel may be connected to the sample chamber 14.

In some embodiments, the sample chamber 14 is a disposable unit which is used one or more times before being discarded and replaced by another disposable chamber. While the disposable units may be replaced after each incubation period which ensures that no residual waste, biosolids, or microorganisms from a previous incubation period influence the next sample. This may not be an issue in all cases so the disposable units may be used over multiple incubation periods and with multiple samples until the measurement accuracy becomes unreliable or outside the range of acceptable values. In some embodiments, the disposable unit is clicked into place within the pipe; in other embodiments, the inlet and/or outlet ports are attached with the pipe.

It is an aspect of this embodiment to communicate the measurements performed in situ to the operator to provide continuously updating data and real-time monitoring of dissolved oxygen consumption. Additionally, the measurement data may be stored in the electronics module 24 associated with the signal detector 20. While the flow-through system may be hardwired to the facility's power supply, in certain circumstances where the system is integrated in a more remote region of the water pipe, the system can easily be connected with a battery pack to support the power requirements.

In some embodiments, the measurement results and feedback provided by the inventive system may be specifically used for adjusting facility operation including aeration control. Maintaining adequate dissolved oxygen levels are critical for the bacteria present in the wastewater; too little DO will slow or inhibit bacterial growth, and too much DO can create undesirable bacterial growth and most importantly results in poor energy efficiency (i.e., higher operational costs). Thus, it would be highly advantageous to employ a system that can provide feedback on DO levels as the system continues to measure the sample so as to balance the needs of the bacteria with energy use.

Example 4: Comparison of Various Measurement Systems

| Method | Result Turnaround | EPA Approval | Automated | Chemicals Required |
|---|---|---|---|---|
| BOD 5-day test | 5 days | Yes | No | Yes |
| Present Invention | 1-3 hours (less with temperature compensation) | No | Yes | No |
| BODTrak II | 2-3 days | No | No | Yes |
| COD and BOD-st* | 45-60 min | No | No | Yes |
| UniLux BOD Indicator | Instant | No | Yes | No |

*Short-term BOD

As previously discussed, the EPA-approved 5-day BOD test is labor-intensive, produces delayed results, and currently cannot be performed in an automated manner. Additional methods have attempted to address the issues of the 5-day BOD test, but none met the requirements of the EPA, reduce cost through automation, reduce reagent costs, or report results in real-time. The BODTraK II system (Hach Company) requires 2-3 days to provide results. The COD and BOD-short-term method cannot be used to fulfill the EPA regulations. The BOD system using the UniLux BOD indicator (Chelsea Technologies) employs an indirect measurement.

The present invention is novel for a few reasons. First, the system quickly provides initial data for process control, and while the samples remain in the system, they will sample chamber 14 complete the 5-day incubation period and fulfill the EPA regulations. Second, during the 5-day period, the samples are continuously sampled, yielding much more precise data, and continuous updates useful for process control. Third, this system directly measures BOD based on DO, which has been the standard approach since the inception of the BOD assay. Alternative tests measure BOD using chemical proxy measurements, but none are approved by the EPA to meet regulatory standards. Furthermore, the present technology has the potential to integrate into a plant's SCADA, which are found in most medium to large scale wastewater treatment facilities.

Figure 11:
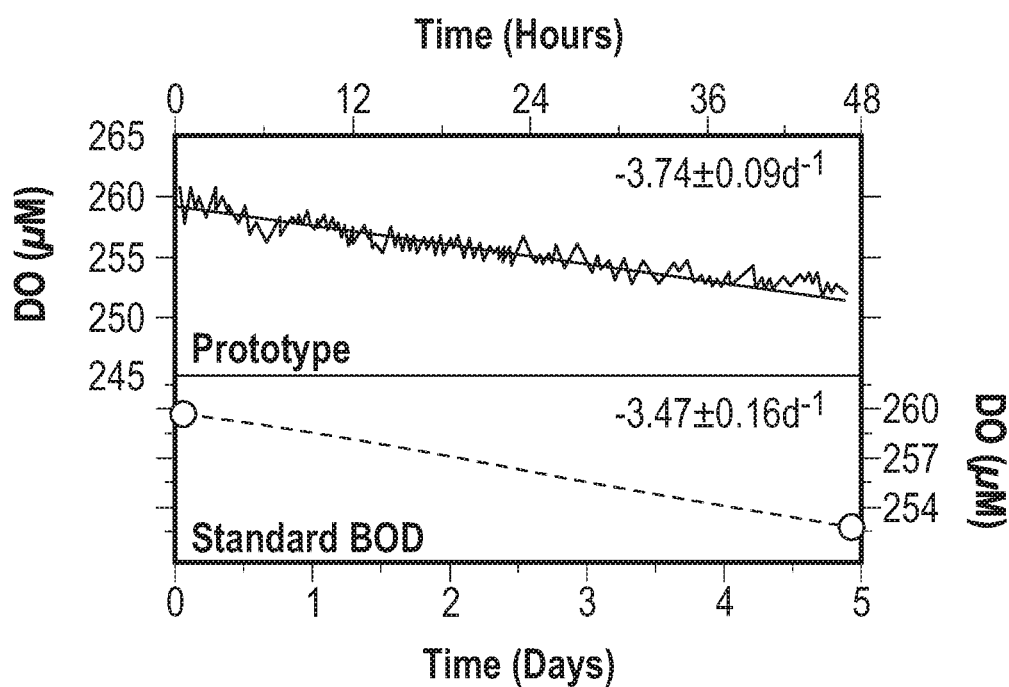
FIG. 11 shows a graph validating the measurement results of the system, referred to as "prototype" compared to the standard EPA BOD measurement method.

The three advantages described above are exemplified in FIG. 11, which depicts the DO measurements made by the embodiment described in EXAMPLE 1 (top) as compared to the two DO measurements made on the same sample source 44 by the standard winkler test (bottom). The frequency of measurements over the five day period is exemplified by the bold solid line. The system further normalizes the concentration fluxuations (thin solid line). The Winkler test, however only provides two DO measurements (white circles), and the rate of BOD must be calculated between these two measurements (dashed line). The BOD rate is displayed in the upper right of each graph, and is comparable ($-3.75\pm0.09 d^{-1}$ vs $-3.47\pm0.16 d^{-1}$, present invention as compared to Winkler test, respectively). The advantage of the present system is that the BOD rate can be achieved much sooner than 5-days, while still achieving the EPA-mandated 5-day test.

The described features, advantages, and characteristics may be combined in any suitable manner in one or more embodiments. One skilled in the relevant art will recognize that the circuit may be practiced without one or more of the specific features or advantages of a particular embodiment.

In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment.

We claim:

1. A system to measure the concentration of an analyte parameter in a sample, comprising:
    at least one sample chamber comprising a vessel with an inlet outlet mechanism and a sealing mechanism configured to produce a sealed sample chamber;
    an analyte detection site attached to the sample chamber, adapted to be in contact with the sample, and configured to generate a first signal in response to an analyte;
    a thermal sensing mechanism configured to measure temperature at the analyte detection site, and generating an associated second signal;
    a signal detector configured to receive and transmitting said first signal;
    an electronics module programmed to receive both the first and second signals; and,
    a sample chamber retainer that holds the sample chamber, wherein the sample chamber retainer aligns the sample chamber and analyte detection site with the signal detector and thermal sensing mechanism, and wherein the first and second signals provide input for computation by the electronics module to determine analyte parameter measurements.

2. The system of claim 1 wherein the signal detector and thermal sensing mechanism are configured to produce said first and second signals multiple times at intervals greater than two seconds without breaking the sample chamber seal.

3. The system of claim 2 wherein said analyte is oxygen or carbon dioxide and at least two analyte parameter measurements are used to calculate Biological Oxygen Demand of said sample.

4. The system of claim 2 wherein said analyte is selected from the group consisting of oxygen, carbon dioxide, nitrogen, hydrogen sulfide, ammonia, methane, silver, barium, lead, arsenic, chromium, cadmium, manganese, aluminum, copper, pathogens, sterols, hormones, polychlorinated biphenyl, dioxins, plasticizers, flame retardants, and microplastics.

5. The system of claim 2 wherein the system further comprises an ambient light blocking mechanism, configured to block at least a portion of electromagnetic spectrum from reaching the sample chamber.

6. The system of claim 2, wherein the thermal sensing mechanism comprises an infrared sensor.

7. The system of claim 2 wherein the analyte detection site comprises an optode, and the signal detector comprises a fluorometric system with an excitation capacity and ability to measure emission from the analyte detection site.

8. The system of claim 2 wherein the sample chamber retainer is configured to hold and measure a plurality of samples.

9. The system of claim 2 wherein the sample chamber retainer comprises a plurality of signal detectors, wherein the sample chamber retainer is configured to hold a plurality of sample chambers and each sample chamber aligns with a signal detector, and wherein the plurality of signal detectors are connected to the electronics module.

10. The system of claim 2, wherein the sample is collected from a source selected from the group comprising wastewater for facility operation control, wastewater for release into the environment, wastewater inflow, seawater, fresh water, well water, lake water, bioreactors, ballast water, and brewery effluent.

11. The system of claim 2, further comprising a temperature control mechanism that can achieve and maintain a temperature range of the sample chamber.

12. The system of claim 2, further comprising an identifier reader and wherein the sample chamber further comprises a sample chamber identifier, wherein the temperature and analyte signals are associated with the sample chamber identifier, and wherein the sample chamber identifier is selected from an electronic identifier tag, a barcode, rotary encoder, a chip, the specific order of signal measurement, or a combination thereof.

13. The system of claim 3 wherein said interval following a first analyte parameter measurement is less than five days and a third analyte parameter measurement of said sample is determined five days after said first analyte parameter measurement and the first analyte parameter measurement and third analyte parameter measurement are used to calculate the five day Biological Oxygen Demand of said sample.

14. The system of claim 11, wherein the temperature is maintained to within 2/100ths of a degree Celsius of a set point temperature.

15. A method for measuring an analyte parameter in a sample, the steps comprising:
    (a) providing an apparatus comprising:
        at least one sample chamber comprising a transparent vessel with an inlet outlet mechanism and a sealing mechanism configured to produce a sealed sample chamber;
        an analyte detection site attached to the sample chamber, adapted to be in contact with the sample, and generating a first signal in response to an analyte;
        a thermal sensing mechanism for measuring temperature at the analyte detection site, and generating an associated second signal;
        a signal detector for receiving and transmitting said first signal;
        an electronics module adapted to receive both the first and second signals; and
        a sample chamber retainer that holds the sample chamber, wherein the retainer aligns the sample chamber and analyte detection site with the signal detector and thermal sensing mechanism, and wherein the first and second signals provide input for computation by said electronics module to determine analyte parameter measurements;
    (b) receiving and sealing the sample in said sample chamber;
    (c) utilizing the analyte detection site to generate said first signal;
    (d) employing a signal detector to receive said first signal;
    (f) communicating the first and second signals to an interconnected electronics module to determine at least one parameter of the analyte.

16. The method of claim 15, further controlling the temperature of the sample chamber within a specific temperature range.

17. The method of claim 16, wherein the temperature is maintained at or near 2/100ths of a degree Celsius of the temperature range.

18. The method of claim 17 further comprising an identifier reader and wherein the sample chamber further comprises a sample chamber identifier, wherein the temperature and analyte signal are associated with the sample chamber identifier, and wherein the sample chamber identifier is selected from an electronic identifier tag, a barcode, rotary encoder, a chip, the specific order of signal measurement, and a combination thereof.

19. The method of claim 18, wherein the analyte is selected from oxygen, $CO_2$, a gas, a surrogate to allow oxygen consumption measurement, and a combination thereof.

20. The method of claim 19, wherein the analyte measurement is used to determine a measurement of BOD.

21. The method of claim 20, further comprising the steps of controlling the level of aeration in a wastewater treatment facility based on the analyte measurement.

* * * * *